(12) United States Patent
Yamanaka

(10) Patent No.: US 12,175,725 B2
(45) Date of Patent: Dec. 24, 2024

(54) IMAGE PROCESSING DEVICE, IMAGE VIEWING SYSTEM, IMAGE PROCESSING PROGRAM, AND IMAGE PROCESSING METHOD

(71) Applicant: Konica Minolta, Inc., Tokyo (JP)

(72) Inventor: Tomoo Yamanaka, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 750 days.

(21) Appl. No.: 17/326,853

(22) Filed: May 21, 2021

(65) Prior Publication Data

US 2022/0019617 A1 Jan. 20, 2022

(30) Foreign Application Priority Data

Jun. 11, 2020 (JP) ................. 2020-101752

(51) Int. Cl.
| | | |
|---|---|---|
| *G06K 9/46* | (2006.01) | |
| *G06F 16/538* | (2019.01) | |
| *G06F 16/58* | (2019.01) | |
| *G06F 16/583* | (2019.01) | |
| *G06T 7/90* | (2017.01) | |
| *G06V 10/56* | (2022.01) | |

(52) U.S. Cl.
CPC ............ *G06V 10/56* (2022.01); *G06F 16/538* (2019.01); *G06F 16/5838* (2019.01); *G06F 16/5866* (2019.01); *G06T 7/90* (2017.01)

(58) Field of Classification Search
CPC ......... G06F 17/30244; G06F 17/30259; G06F 17/30256; G06F 17/30663; G06F 17/30687; G06F 17/30864; G06F 17/30017; G06F 7/30244; G06F 7/30259; G06F 7/30256; G06F 7/30663; G06F 7/30687; G06F 7/30864; G06F 7/30017
See application file for complete search history.

(56) References Cited

U.S. PATENT DOCUMENTS

2004/0267740 A1* 12/2004 Liu ..................... G06F 16/5862

FOREIGN PATENT DOCUMENTS

| JP | 2001-166908 | 6/2001 |
|---|---|---|
| JP | 2019-159526 | 9/2019 |

* cited by examiner

*Primary Examiner* — Duy M Dang
(74) *Attorney, Agent, or Firm* — BakerHostetler

(57) ABSTRACT

An image processing device assists searching for image data in an image viewing service, and includes: a recognizer that recognizes a part representing a target object from the image data; an extractor that extracts a color used in pixels in the part recognized; a determiner that determines a color that is not extracted from the part but is likely to be used in searching by a service user, based on a search tendency in searching by the service user; and an adder that creates a first tag indicating the color extracted by the extractor and a second tag indicating the color determined by the determiner and adds the first tag and the second tag as search tags to the image data.

18 Claims, 21 Drawing Sheets

FIG. 5

| COLOR NAME | COLOR CODE | RGB VALUES |
|---|---|---|
| MASOHO | #ec6d71 | R:236 G:109 B:113 |
| AKAMURASAKI | #eb6ea5 | R:235 G:110 B:165 |
| TSUTSUJI-IRO | #e95295 | R:233 G:82 B:149 |
| BOTAN-IRO | #e7609e | R:231 G:96 B:158 |
| IMAYOU-IRO | #d0576b | R:208 G:87 B:107 |
| BARA-IRO | #e9546b | R:233 G:84 B:107 |
| MOMO-IRO | #f09199 | R:240 G:145 B:153 |
| AKA | #e60033 | R:230 G:0 B:51 |
| SHOJOHI | #e2041b | R:226 G:4 B:27 |
| BENI | #d7003a | R:215 G:0 B:58 |
| KOKIAKE | #c9171e | R:201 G:23 B:30 |
| HI-IRO | #d3381c | R:211 G:56 B:28 |
| BENIAKA | #d9333f | R:217 G:5 B:63 |
| ENJI | #b94047 | R:185 G:64 B:71 |
| OTOME-IRO | #F9D0C5 | R:243 G:166 B:150 |

FIG. 6

| TYPE | TRAINING DATA |
|---|---|
| ROSE | DISCRIMINANT FUNCTION $F_1$ FOR DISCRIMINATING POINT CLOUD OF FEATURES REPRESENTING ROSE |
| POMEGRANATE | DISCRIMINANT FUNCTION $F_2$ FOR DISCRIMINATING POINT CLOUD OF FEATURES REPRESENTING POMEGRANATE |
| AZALEA | DISCRIMINANT FUNCTION $F_3$ FOR DISCRIMINATING POINT CLOUD OF FEATURES REPRESENTING AZALEA |
| OTOME TSUBAKI | DISCRIMINANT FUNCTION $F_4$ FOR DISCRIMINATING POINT CLOUD OF FEATURES REPRESENTING OTOME TSUBAKI |
| HYDRANGEA | DISCRIMINANT FUNCTION $F_5$ FOR DISCRIMINATING POINT CLOUD OF FEATURES REPRESENTING HYDRANGEA |
| APPLE | DISCRIMINANT FUNCTION $F_6$ FOR DISCRIMINATING POINT CLOUD OF FEATURES REPRESENTING APPLE |
| WATER MELON | DISCRIMINANT FUNCTION $F_7$ FOR DISCRIMINATING POINT CLOUD OF FEATURES REPRESENTING WATER MELON |
| MELON | DISCRIMINANT FUNCTION $F_8$ FOR DISCRIMINATING POINT CLOUD OF FEATURES REPRESENTING MELON |
| JAPANESE PERSIMMON | DISCRIMINANT FUNCTION $F_9$ FOR DISCRIMINATING POINT CLOUD OF FEATURES REPRESENTING JAPANESE PERSIMMON |

FIG. 7

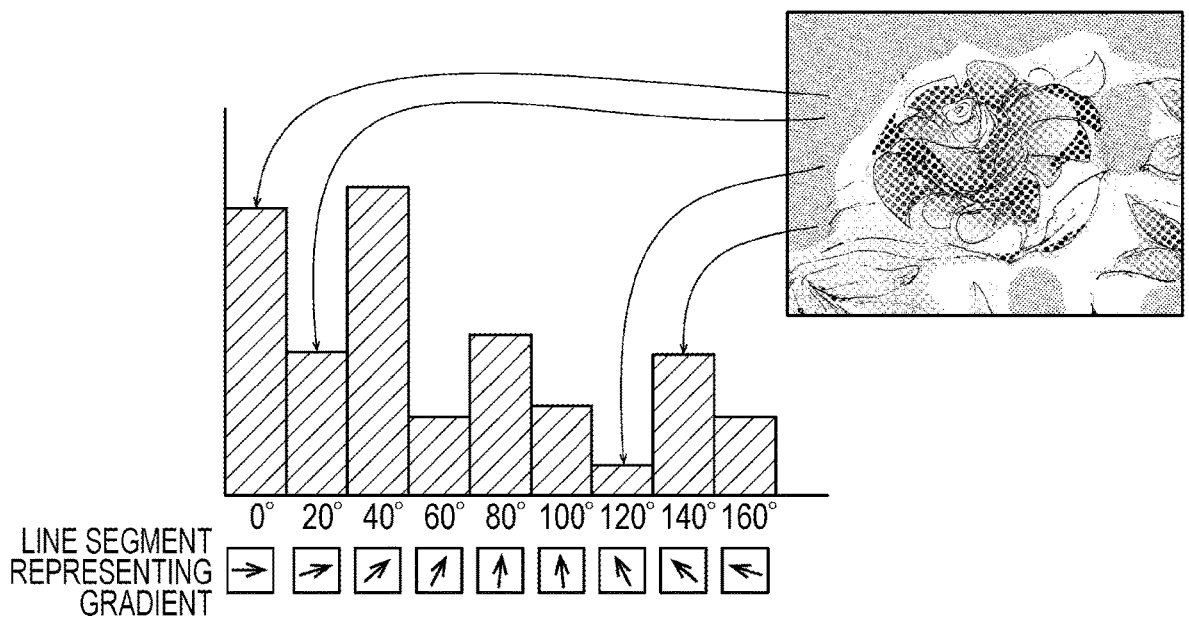

FIG. 10

EXTENDED COLOR TABLE

| TYPE | EXTENDED COLOR |
|---|---|
| ROSE | AKA-IRO |
| POMEGRANATE | MURASAKI-IRO |
| AZALEA | AKA-IRO |
| OTOME TSUBAKI | MOMO-IRO |
| SETTING SUN | AKA-IRO |
| HYDRANGEA | MURASAKI-IRO |
| APPLE | AKA-IRO |
| WATER MELON | MIDORI-IRO |
| MELON | KIMIDORI |
| JAPANESE PERSIMMON | KAKI-IRO |

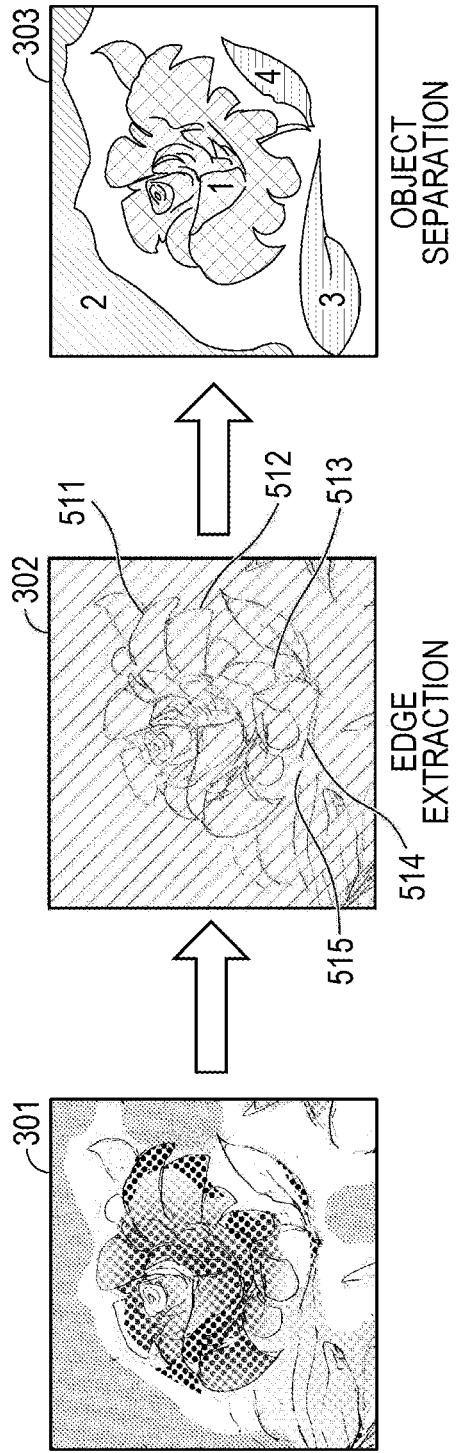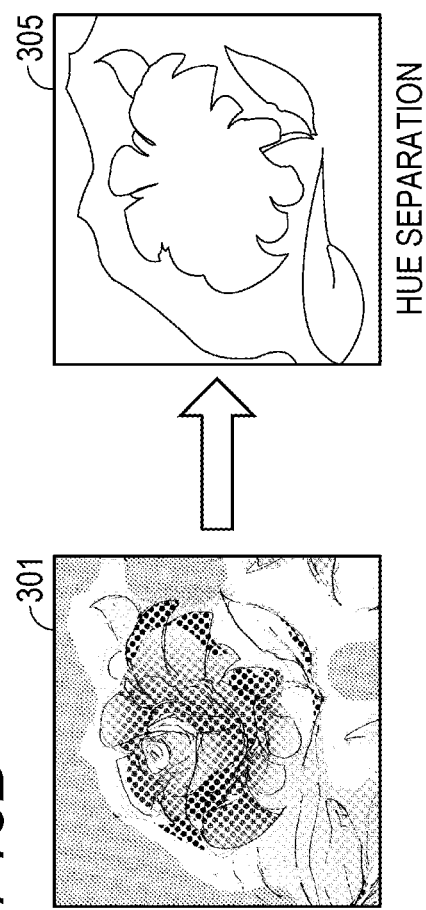

FIG. 20
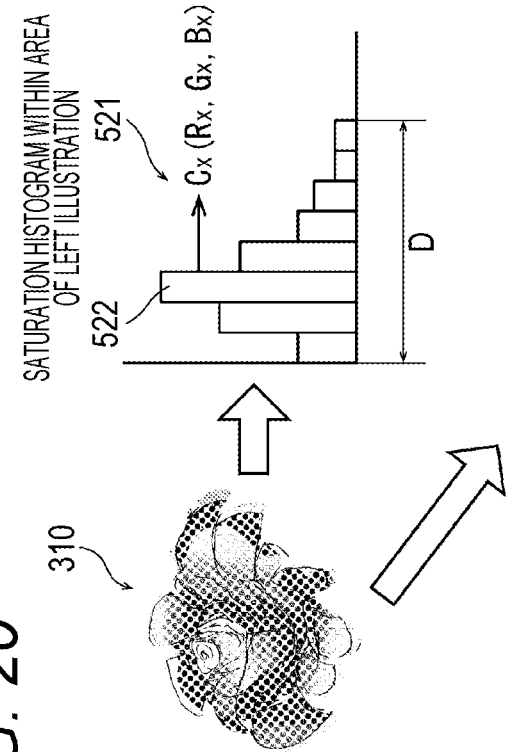
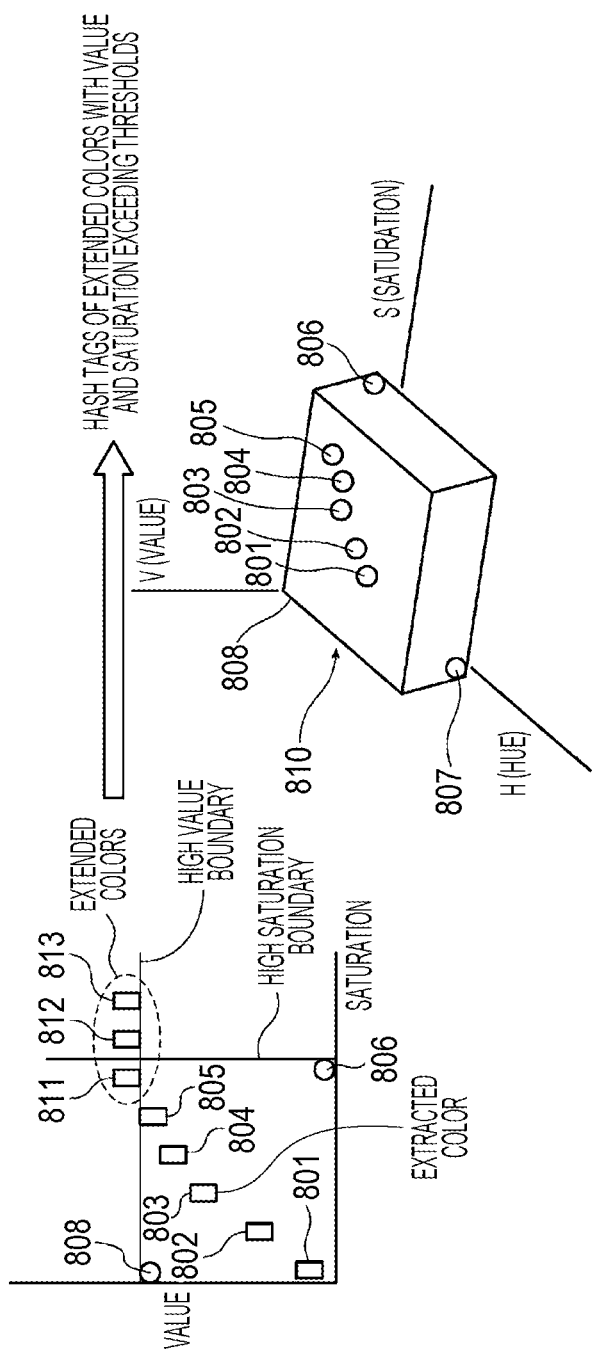

IMAGE PROCESSING DEVICE, IMAGE VIEWING SYSTEM, IMAGE PROCESSING PROGRAM, AND IMAGE PROCESSING METHOD

The entire disclosure of Japanese patent Application No. 2020-101752, filed on Jun. 11, 2020, is incorporated herein by reference in its entirety.

BACKGROUND

Technological Field

The present disclosure relates to an image processing device that extracts colors used in pixels in image data, and particularly to improvements in posting image data to a social networking service (SNS).

Description of the Related art

An SNS is used for various purposes from personal interests to corporate marketing and government public relations activities. Service users who use the SNS make a text search and an image search in search for image data they want to see. The number of times of image data display on the service user browser due to such search is referred to as "impressions". In addition, the number of times of positive actions taken by the service users, such as gazing and enlarging image data, accessing the contributor's page, and clicking the "Like!" icon, is referred to as "engagement". Increasing the impressions and engagement is one of the keys to information dissemination. A contributor who wants to disseminate information creates a text string expressing the characteristics of image to be posted, and uploads the image data together with this text string to the server of the SNS service to improve the impressions and engagement.

CITATION LIST

Patent Literature

Patent Literature 1: JP 2001-166908 A
Patent Literature 2: JP 2019-159526 A

Meanwhile, in recent years, search engines capable of performing color searching have been studied. In such color searching, a palette of color samples is displayed in the browser, and the selection of a color that the service user wants to see is received from the service user. In response to the selection of the color from the palette, image data is searched with the selected color as a search condition. This is because that color is one of the design elements, as well as shapes and patterns and there are not a few service users who use color as a clue and select products to be purchased.

In the color searching, a color selected from the palette is specified as a search condition. Thus, in order for many service users to see image data in the color searching, the text string indicating the correct color name listed in the color samples needs to be uploaded together with the image data to the service of the SNS service. Traditional Japanese and Western colors are classified variously. Thus, there is no guarantee that ordinary service users who have no knowledge of clothing, design, and art will list the color name in such classifications. If a service user creates a text string indicating a color name and uploads image data to the SNS server with incorrect knowledge, there is no improvement in the impressions and engagement. In addition, there is no guarantee that a service user who performs searching selects a color correctly in accordance with the classification of traditional Japanese and Western colors. As a result, there is no improvement in the impressions and engagement for the posted image data due to the synergistic effect with the mistake by the person who posted the image data and the mistake by the service user who performed searching.

It is also conceivable to mechanically extract a color and creates a text string with an image processing device. However, there is no guarantee that a characteristic color occupies the large area of image data. Thus, if the image processing device mechanically extracts a pixel color and creates a text string indicating the name of the extracted color, the characteristics of the target object appearing in the image data are not expressed with the text string. Even if such a text string for posting is created and the image data is uploaded to the SNS server, the impressions and engagement will not be improved.

SUMMARY

An object of the present disclosure is to provide an image processing device capable of allowing many service users to view image data in search for the image data with a search condition based on color selection from a palette in an image viewing system.

To achieve the abovementioned object, according to an aspect of the present invention, there is provided an image processing device that assists searching for image data in an image viewing service, and the image processing device reflecting one aspect of the present invention comprises: a recognizer that recognizes a part representing a target object from the image data; an extractor that extracts a color used in pixels in the part recognized; a determiner that determines a color that is not extracted from the part but is likely to be used in searching by a service user, based on a search tendency in searching by the service user; and an adder that creates a first tag indicating the color extracted by the extractor and a second tag indicating the color determined by the determiner and adds the first tag and the second tag as search tags to the image data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 exemplarily illustrates color sample data in which the KGB values of an image in association with a color name and a color code;

FIG. 6 exemplarily illustrates pieces of training data corresponding one-to-one to a plurality of types for a subject;

FIG. 7 illustrates histogram of oriented gradients (HOG) features;

FIG. 10 exemplarily illustrates an extended color table;

FIG. 13A illustrates the process of edge extraction;

FIG. 13B illustrates the process of hue separation;

FIG. 20 is illustrates the process of determination an extended color with emphasized value and saturation;

DETAILED DESCRIPTION OF EMBODIMENTS

Hereinafter, one or more embodiments of an image processing device according to the present invention will be described with reference to the drawings. However, the scope of the invention is not limited to the disclosed embodiments.

[1] First Embodiment

Figure 1:
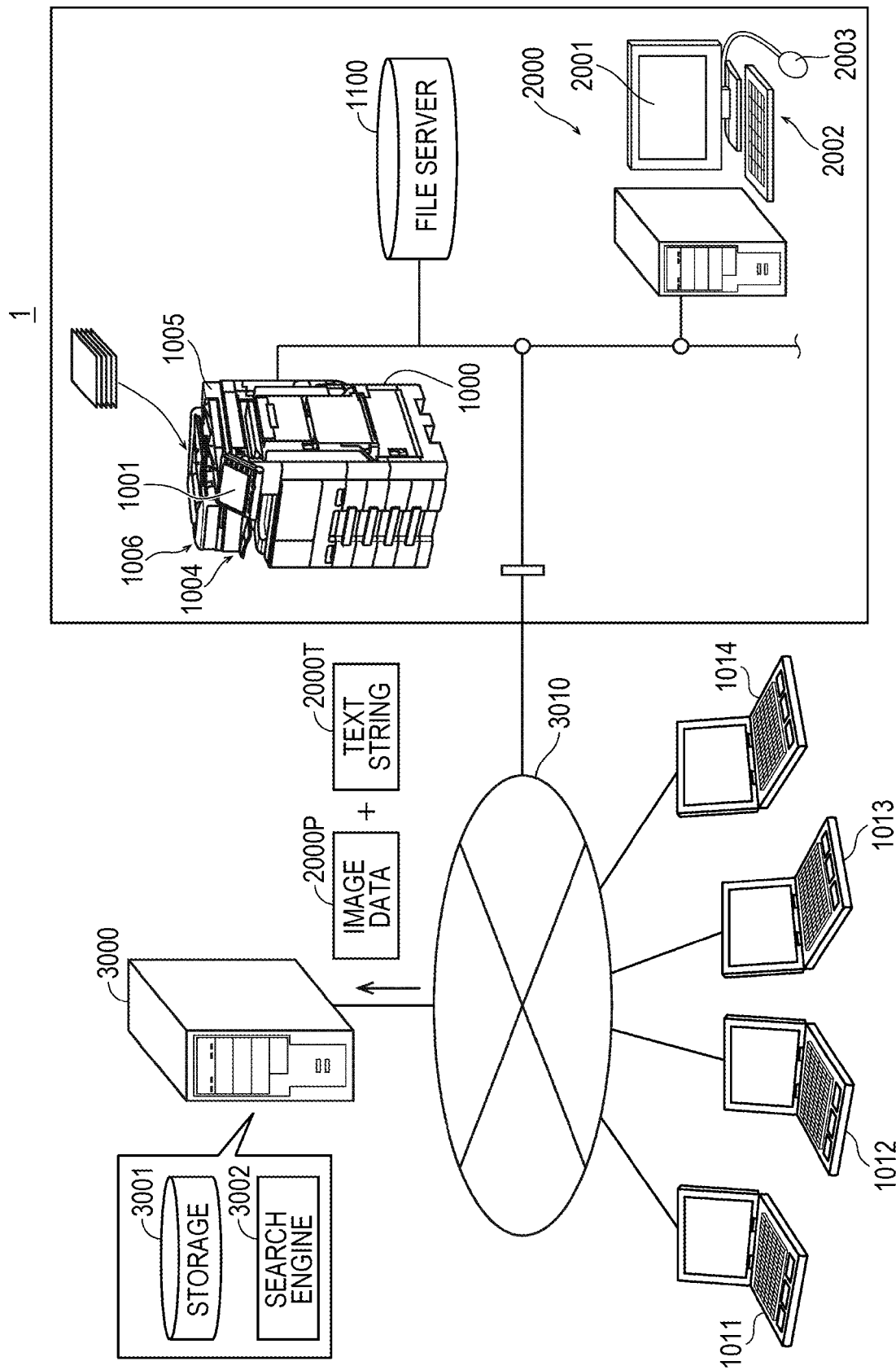
FIG. 1 illustrates an image viewing system including an image processing device according to the present disclosure.

FIG. 1 illustrates an image viewing system 1 including an image processing device 2000 according to the present disclosure. As illustrated in FIG. 1, the image viewing system 1 includes a multifunction peripheral (MFP) 1000; terminals 1011, 1012, 1013, and 1014; the image processing device 2000; and a social networking service (SNS) server 3000 (including a storage 3001 and a search engine 3002).

The MFP 1000 draws out documents one by one from the bundle of documents placed on the placement table of an automatic document feeder 1006 integrally formed with a document retaining cover 1005, and reads the documents with a scanner 1004 in response to an operation on a touch panel display 1001 to acquire image data corresponding to each document. Image data represents an image with an RGB color mixing system. Image data is transferred and stored in a file format such as JPEG, TIFF, PDF, or compact PDF. In image data displayed on the web page, RGB values with 24-bit information are assigned to each pixel. The RGB values represent various colors in additive mixing of a value of R in 256 gradation levels (0 to 255), a value of G in 256 gradation levels (0 to 255), and a value of B in 256 gradation levels (0 to 255). Such a value of R, a value of B, and a value of G represent three-dimensional coordinates in the RGB color space in the RGB color mixing system (typically referred to as RGB color space).

The image processing device 2000 takes in the image data read by the MFP 1000 and the image data stored in a file server 1100, adds an appropriate tag to each piece of image data, and uploads the tagged image data to the storage of the SNS server 3000. A tag is a text string that is associated with an image data file, and transferred and stored together with the image data file. The tag has various types such as a tag included in the attribute information or the file management information of the image data file, a tag stored in the link information of the image data file, and a tag stored in the same directory as the image data file. The number of characters is limited for posting a text string at one time (for example, within 200 characters or less), and a person who is to post an image (hereinafter referred to as contributor) within the limitation range can add two or more tags to the image data.

The SNS server 3000 receives posting of image data through a public network 3010, and provides a viewing service for the posted image data to terminals 1011, 1012, 1013, and 1014. In order to provide the image viewing service, screen data including various screens such as a login screen, a start screen, a search-condition setting screen, and a search-result display screen is created and transmitted to the terminals 1011 to 1014 operated by the SNS service users.

Figure 2A:
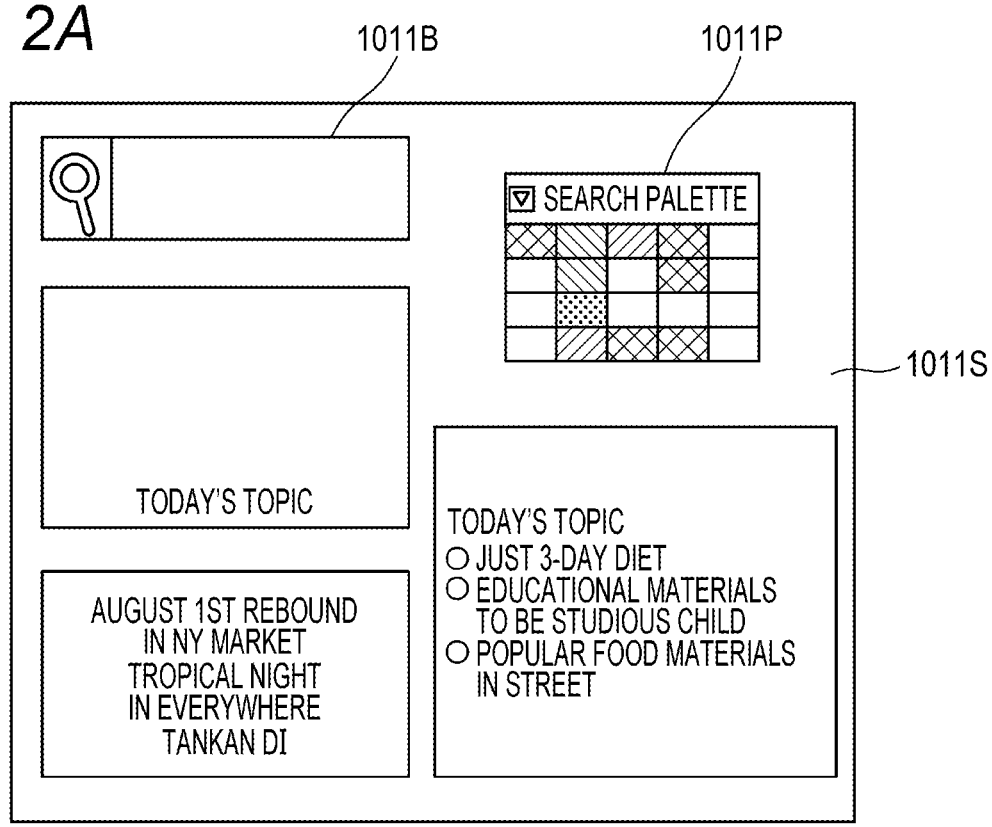
FIGS. 2A and 2B exemplarily illustrate a search screen that enables color selection by clicking a pull-down menu and pulling out a palette.
Figure 2B:
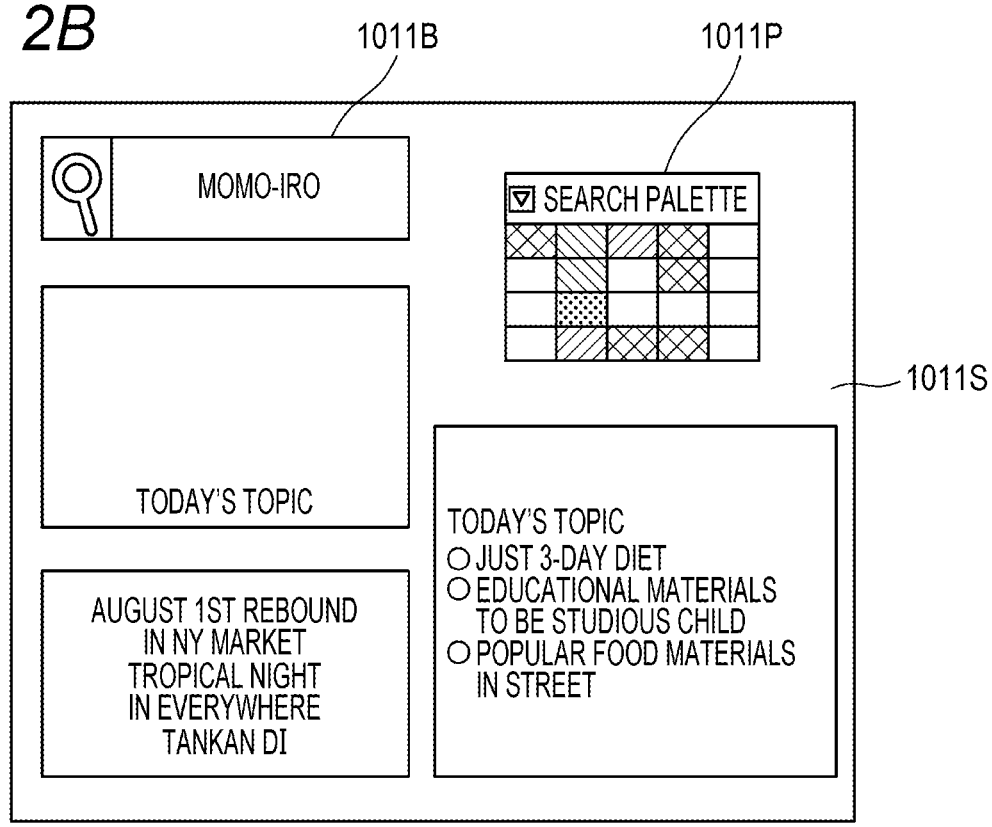

Each of the terminals 1011, 1012, 1013, and 1014 has an operating system installed thereon, and launching a browser in the operating system causes its display to display the various screens provided by the SNS server 3000. FIG. 2A exemplarily illustrates a search-condition setting screen displayed in the browser. On the search screen in FIG. 2A, clicking the pull-down menu and pulling out a palette 1011P enables color selection. In response to selection of any color on the palette 1011P, as illustrated in FIG. 2B, at least one text string (momo-iro in the figure) indicating the color name selected from the palette is input into a search field 1011B. As a result, a search command with "momo-iro" as a keyword is output to the SNS server 3000.

The storage 3001 includes a plurality of network drives under the authority of the administrator of the image viewing system 1. The storage 3001 has a directory for each account. Each time a contributor who has a corresponding account makes a post, a subdirectory is created in the directory for the account. The subdirectory is a posting area corresponding to the first posting by the contributor, and the image data and the text string uploaded by the contributor are collectively stored in this posting area.

The search engine 3002 is one of the service providing programs launched by the SNS server 3000. In response to a search command including a search condition is transmitted from any of the browsers of terminals 1011 to 1014, the search engine 3002 searches the storage 3001 for any image data with a tag matching the search condition.

In the searching by the search engine 3002, an AND condition or an OR condition for at least two colors can be specified, and under the AND condition, image data posted with at least two tags each indicating a different color is hit. Under the OR condition, image data posted with any of at least two tags each indicating a different color is hit.

Figure 3:
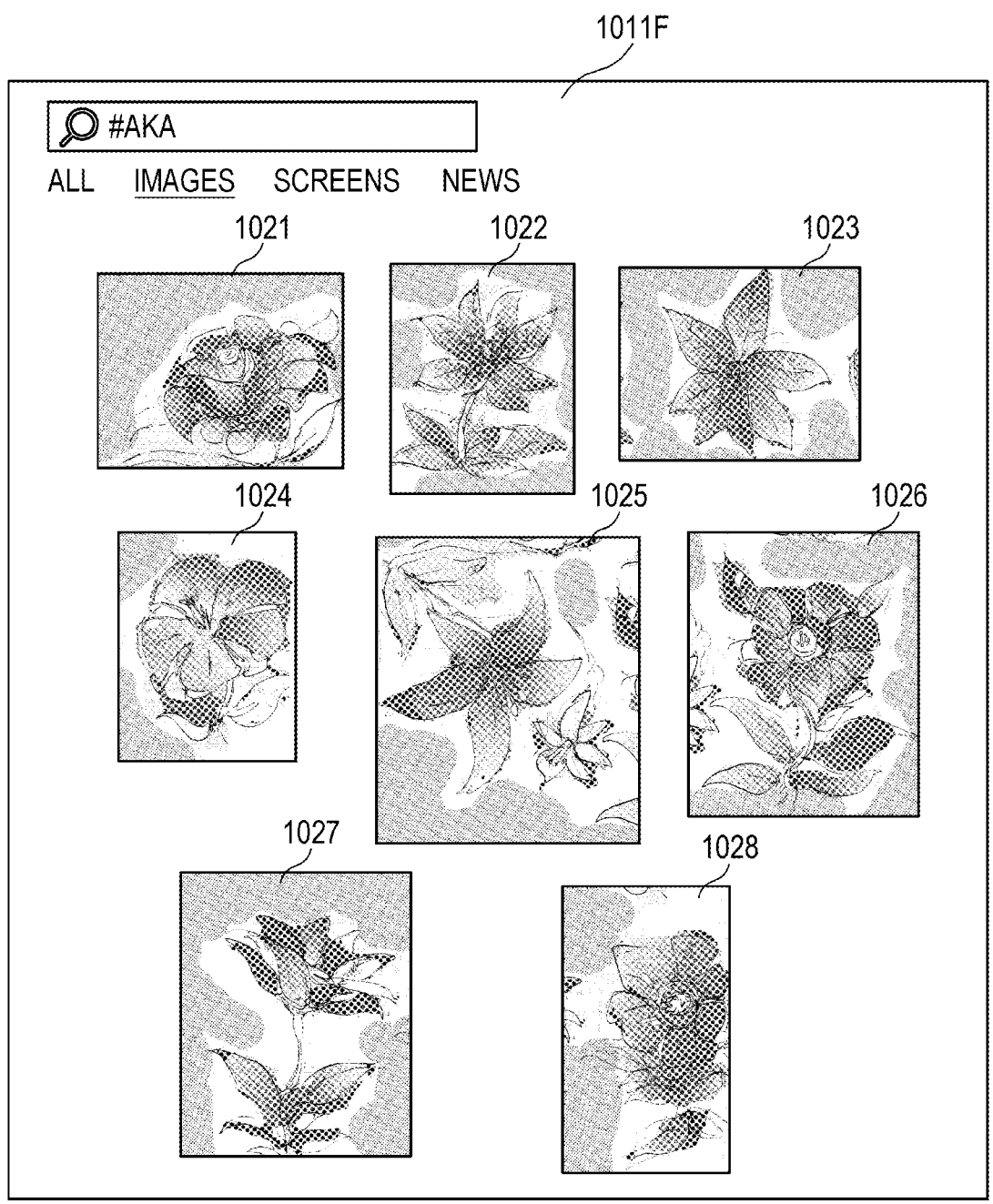
FIG. 3 exemplarily illustrates a search result screen displayed on a terminal.

If image data with a matched tag is present in the storage 3001, a search result screen is created and displayed on the requesting terminal. FIG. 3 exemplarily illustrates a search result screen 1011F. As illustrated in the figure, the search result screen has a plurality of reduced images 1021, 1022, 1023, 1024, 1025, and ... of the image data matching a search condition disposed and listed. In response to clicking any reduced image, the clicked reduced image is enlarged and displayed.

The search engine 3002 also performs a listing function in response to clicking a hashtag. The hashtag is a character string with a hash mark "#" prepended to a sentence. When the search result screen is displayed in the browser of the terminal 1011 and the SNS user who is the viewer clicks the hashtag, the SNS server 3000 reads a plurality of pieces of image data with the same hashtag from the storage 3001 and causes the browsers of terminals 1011 to 1014 to display the plurality of pieced of image data.

[2] Image Processing Device 2000

Figure 4:
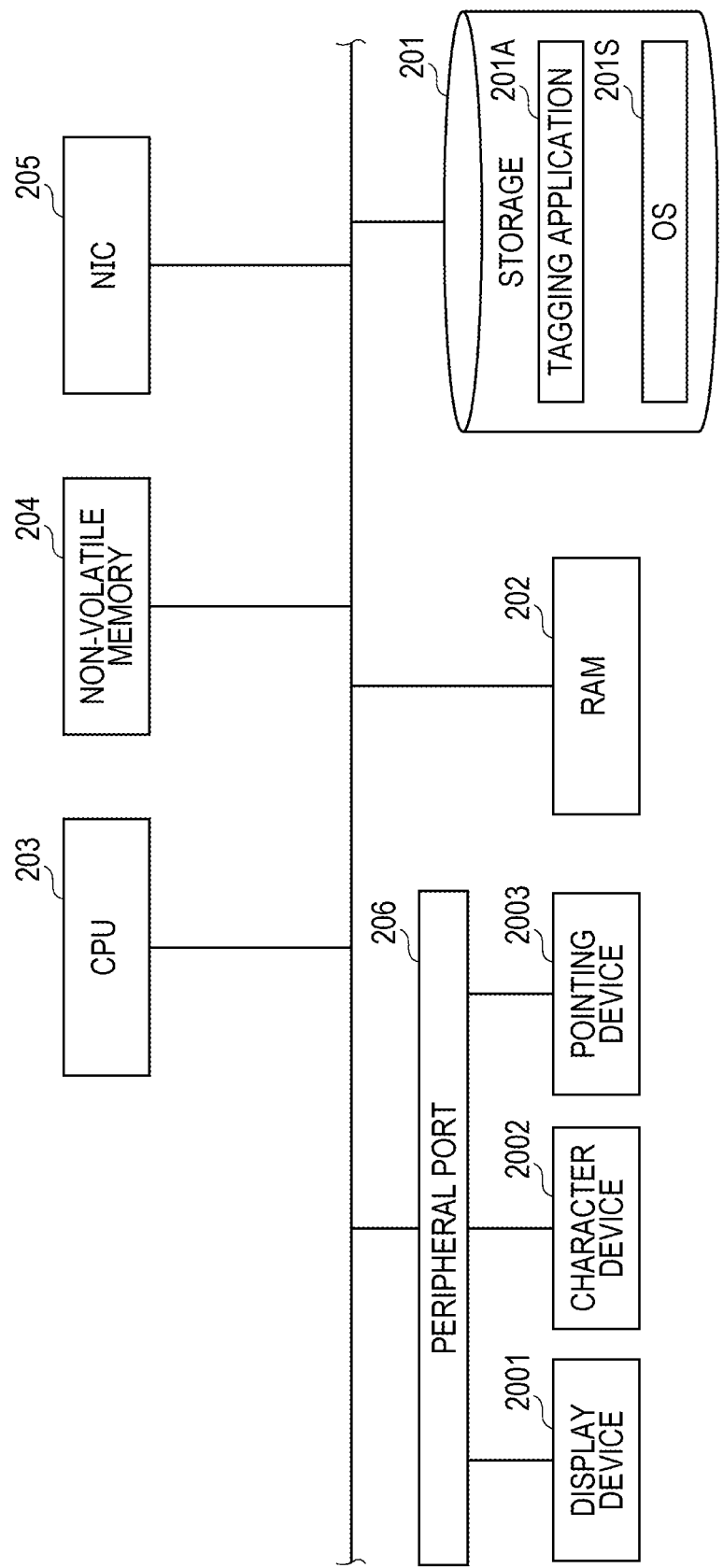
FIG. 4 illustrates the control system of the image processing device.

FIG. 4 illustrates the control system of the image processing device 2000. As illustrated in FIG. 4, the image processing device 2000 includes a storage 201, a random access memory (RAM) 202, a central processing unit (CPU) 203, a non-volatile memory 204, a network interface card (NIC) 205, and a peripheral port 206. The image processing device 2000 performs input and output of image data through the NIC. The storage 201 serves as a hard disk drive (HDD) or a solid state drive (SSD) on which an operating system (OS) 201S and a tagging application 201A are installed. The OS 201S and the tagging application 201A installed in the storage 201 are loaded on the RAM 202. The CPU 203 reads an execution code included in the OS 201S or the tagging application 201A and decodes the execution code for execution. The non-volatile memory 204 stores various settings for operation of the tagging application 201A. The NIC 205 performs input and output of image data between the NIC 205, the MFP 1000, and the SNS server 3000. In the input and output, image data acquired by reading with the automatic document feeder 1006 of the MFP 1000 is taken in and written into the storage 201. The CPU 203 also uploads the image data written in the storage 201 to the SNS server 3000.

Color sample data is stored in the non-volatile memory 204. As illustrated in FIG. 5, color sample data is data in which the RGB values of image are associated with the corresponding color name and color code. A color name is a text string defined as a color name in a color sample of a type such as primary color, Japanese color, Western color, web216, pastel color, vivid color, monotone, or metro color. A color code is a text string indicating a 3-byte hexadecimal value. A tag added to image data is created with the text string and the color code listed in this color sample.

[3] Details of Control By Tagging Application 201A

The tagging application 201A installed in the storage 201 performs image processing on the image data read in the RAM 202, and creates a color tag to be added to the image data, with a color name or color code listed in the color sample data. A color tag is a hash tag that enables search for image data by color selection from the palette, and has a structure in which a hash mark is prepended to a text string indicating a color name and a color code.

(3-1) Pre-Processing for Tag Creation

Pre-processing to be performed prior to tag creation includes supervised learning of a subject shown in image data. Such supervised training is achieved by interactive operation with a display device 2001, a character device 2002, and a pointing device 2003.

In the supervised training, features are extracted from the samples of image data and types for a subject shown in the image data are set, and then a recognition dictionary for recognition of the types for the subject shown in the image data is constructed. As illustrated in FIG. 6, the recognition dictionary includes pieces of training data corresponding one-to-one to a plurality of types for a subject. The example in FIG. 6 has a format in which pieces of data of discriminant functions $F_1$, $F_2$, $F_3$, $F_4$, $F_5$, and ... that define the hyperplane of a hard margin support vector machine (SVM) are in one-to-one association with types of a real object such as rose, pomegranate, azalea, or otome tsubaki.

As features, it is desirable to use features with a reasonable record of use in the field of machine learning, such histogram of oriented gradients (HOG) features as illustrated in FIG. 7.

Figure 8:
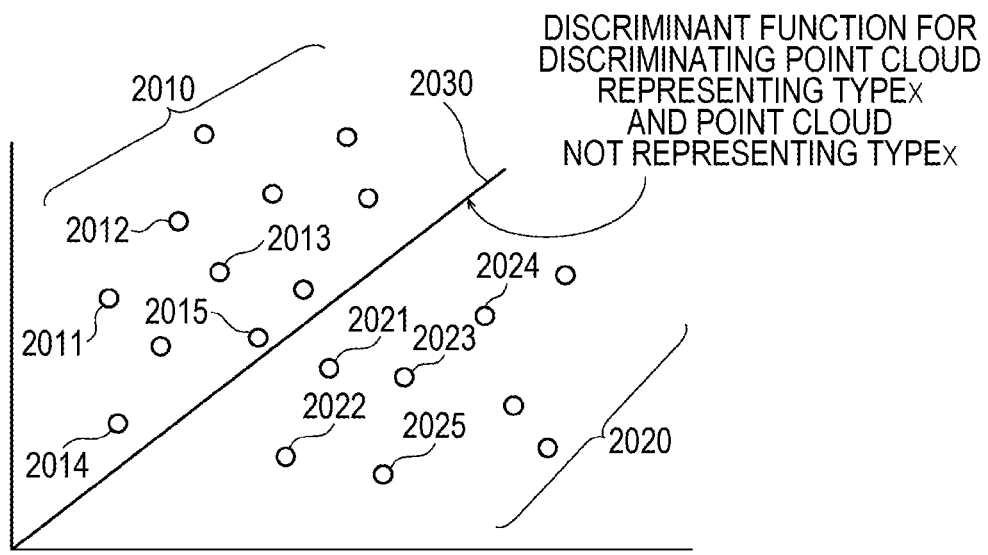
FIG. 8 is a scatter diagram with a plurality of features plotted.

The HOG features in the figure are obtained by aggregation of the number of line segments shown in 8×8 pixels for nine gradient directions (0°, 20°, 40°, 60°, 80°, 100°, 120°, 140°, and 160°). Extraction of features from a large number samples of image data gives the scatter diagram in FIG. 8 In the scatter diagram in FIG. 8, features 2011, 2012, 2013, 2014, and 2015 acquired from the plurality of samples of the image data and features 2021, 2022, 2023, 2024, and 2025 are plotted on a two-dimensional plane.

The discriminant functions in the training data illustrated in FIG. 6 define a hyperplane 2030 that separates the features plotted in the scatter diagram as above into two point clouds 2010 and 2020. The hyperplane 2030 in FIG. 8 defined by the discriminant functions separates the features extracted from the image data read by the automatic document feeder 1006 and the scanner 1004 into the point could 2010 including the features 2011, 2012, 2013, 2014, and 2015 acquired from the plurality of samples of image data and the point group 2020 including the features 2021, 2022, 2023, 2024, and 2025 that do not represent the corresponding types. Such separation enables recognition what type the image data read by the scanner 1004 has.

Figure 9:
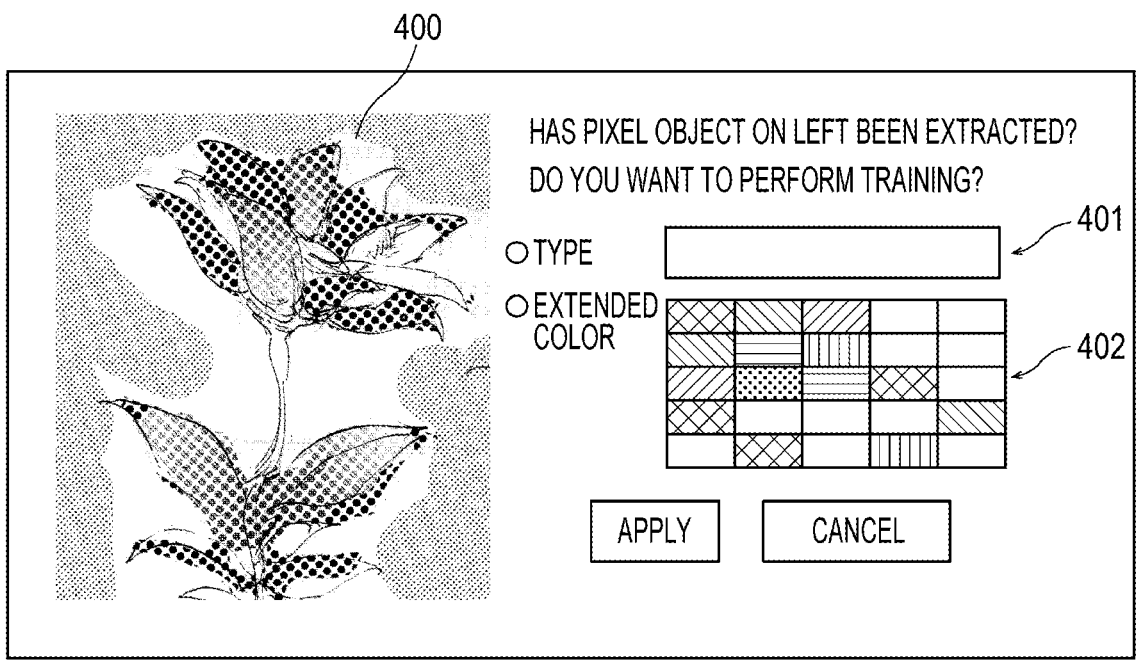
FIG. 9 exemplarily illustrates a setting screen displayed on a display device in the process of training a type for a subject.

FIG. 9 exemplarily illustrates a setting screen displayed on the display device 2001 in the process of training a type for a subject. On the setting screen, a sample of image data to be feature-extracted is arranged in a window 400. An input field 401 for reception of input of characters included in a text string is arranged adjacent to the window 400. The text string input in the input field 401 is regarded as a type of the target object appearing in the sample arranged on the left and the text string is stored in the non-volatile memory 204. The setting screen in FIG. 9 is characteristic in that a palette 402 is arranged below the input field 401 and any of a plurality of colors listed on the palette 402 can be specified. In response to selection of any of the colors displayed on the palette 402 in operation with the pointing device 2003, a table (extended color table in FIG. 10) in which the color as an extended color is in association with a type for a subject is written into the non-volatile memory 204. As illustrated in FIG. 10, the extended color table has a format in which extended colors are in association with types of a real object such as rose, pomegranate, azalea, or otome tsubaki. Most of the ordinary persons without insight into, design, art, and the like remember the color of a subject in correlation to the impression of the subject. The memory with such association is due to a biased view, for example, the setting sun is red or the apple is red (pseudo-memory). In search relying on such pseudo memory, no image with the tag indicating an extracted color is hit at all. Although the apple or the setting sun is perceived as "red," they are not drawn in red pixels in images acquired by practically shooting the apple or the sunset. This is because no red pixel is extracted from the images of the apple or the setting sun and even if red pixels are extracted, the number is small. Thus, an extended color table is provided and a color associated with pseudo memory is selected as a tagging target.

(3-2) Main Routine for Tag Creation

Figure 11:
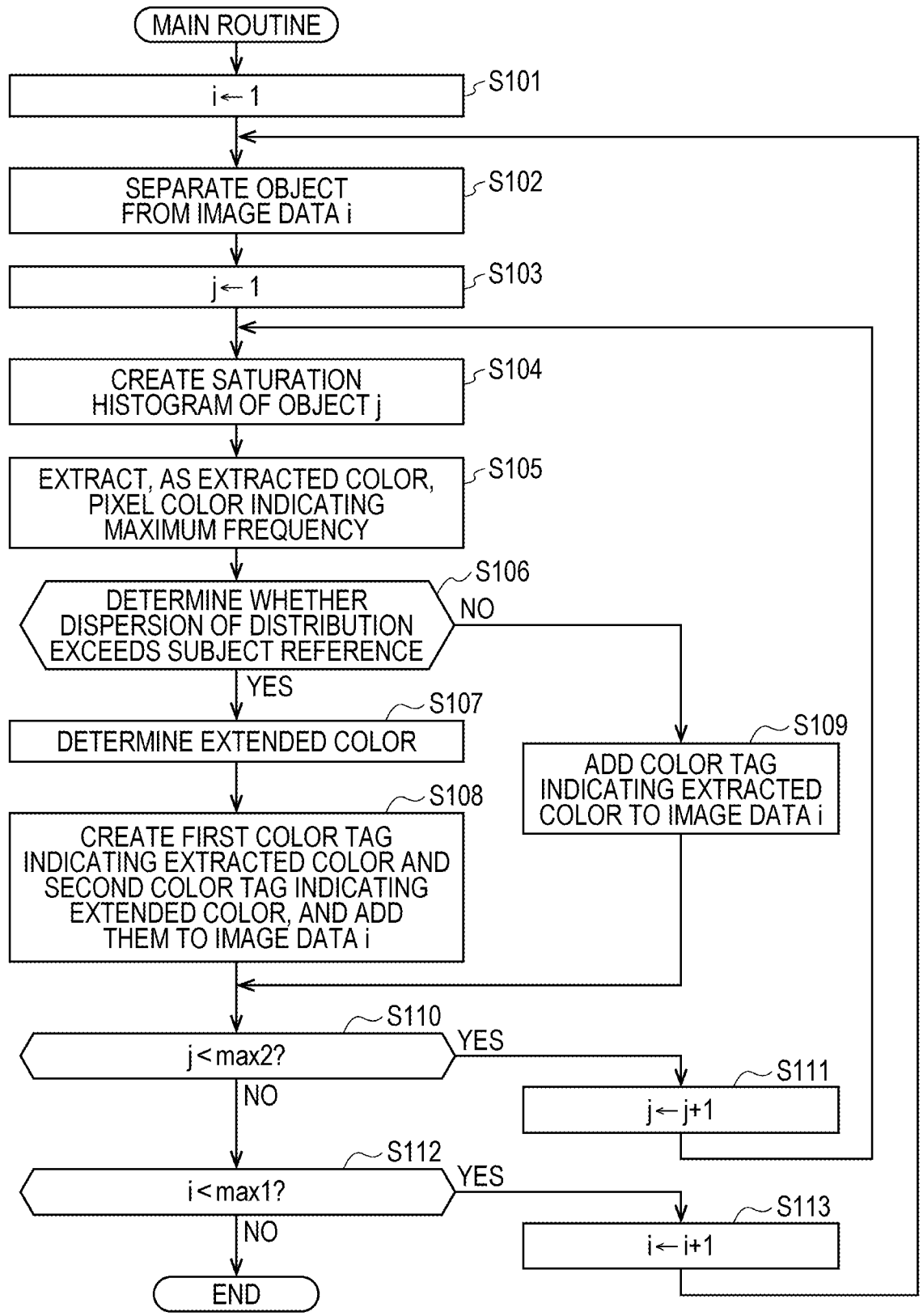
FIG. 11 is a flowchart illustrating the main routine of a tag creation procedure.

The tagging application 201A creates a tag for each piece of image data read by the automatic document feeder 1006 and the scanner 1004 of the MFP1000. The flowchart of FIG. 11 illustrates this creation procedure. In this figure, the variable max1 indicates the number of pieces of image data read by the automatic document feeder 1006. The variable i indicates each of a plurality of pieces of image data read by the automatic document feeder 1006, and the value varies from 1 to max1. The variable max2 indicates the total number of objects separated from the i-th image data. The variable j indicates each of a plurality of objects extracted from the i-th image data, and the value varies from 1 to max2.

In step S101, the variable i is set to 1, and in step S102, at least one object is separated from the image data i. Here, an object is a group of pixels representing a real object, and is a pixel group having some kind of unity, such as a plurality of pixels that is collected to achieve gradation in light and darkness, or that is unified with similar colors. Subsequently, the variable j is set to 1 (step S103) to create the saturation histogram of the j-th object (object j) (step S104). Specifically, the RGB values of each pixel included in the object are converted into HSV values (consisting of a value of H as hue, a value of S as saturation, and a value of V as value). Then, the number of appearances of pixels having the same saturation is counted. As a result, the saturation histogram indicating the appearance frequency of each saturation can be acquired.

Then, the pixel color indicating the maximum frequency in the saturation histogram is converted from the HSV values into RGB values, and then the color specified by the converted RGB values is extracted as an extracted color (step S105). In step S106, performed is determination regarding whether the spread of the saturation histogram exceeds a subject reference. The subject reference here is a value empirically set for discrimination regarding whether an object is the subject acquired by shooting a real object, and is set to about 4 to 8 colors. The subject acquired by shooting a real object has complicated color tone and gradation due to the irradiation and reflection of ambient light. However, charts, illustrations, and the like created with a document creation application have no complicated color tone and gradation. Therefore, the spread of the saturation histogram is compared with the subject reference to perform discrimination regarding whether the object is the subject acquired by shooting a real object. An object that is not a subject acquired by shooting and is similar to the subject (such as an object in a painting depicted by a natural painting method or the like) is also determined similarly to the subject. This is because any object represented by such a depiction also needs to be treated the same as the subject.

If the spread of the distribution exceeds the subject reference and a gradation is present in the saturation histogram (Yes in step S106), an extended color is determined (step S107). Then, a first color tag indicating an extracted color and a second color tag indicating the extended color are added to the image data i (step S108).

If the spread of distribution is not shown and no gradation is present in the saturation histogram (No in step S106), a color tag indicating an extracted color is added to the image data i (step S109).

Step S110 is determination regarding whether the loop continuation condition is satisfied. If the variable j indicating the object falls below the total number of objects max2 (Yes in step S110), the variable j is incremented (step S111), and the flow returns to step S104. As long as the variable j falls below the total number of objects max2, the repetition of steps S104 to S111 continues. As a result, the individual objects on the page j are subjected to processing.

When the variable j reaches the total number of objects max2 and the processing on all the objects is completed, the result of the determination in step S110 defining the continuation condition becomes No. Step S112 is determination regarding whether the loop continuation conditions of steps S102 to S111 are satisfied. If the variable i indicating the image data falls below the total number of pieces of image data max1 (Yes in step S112), the variable i is incremented, and the flow returns to step S102 (step S113). As long as the variable i falls below the total number of pieces of image data max1, the repetition of steps S102 to S113 continues. As a result, the individual pieces of image data are subjected to processing. When the variable i reaches the total number of pieces of image data max1 and the processing on all the pieces of image data is completed, the result of the determination in step S112 defining the end condition becomes No, and the processing of this flowchart ends.

(3-3) Object Separation Procedure

Figure 12A:
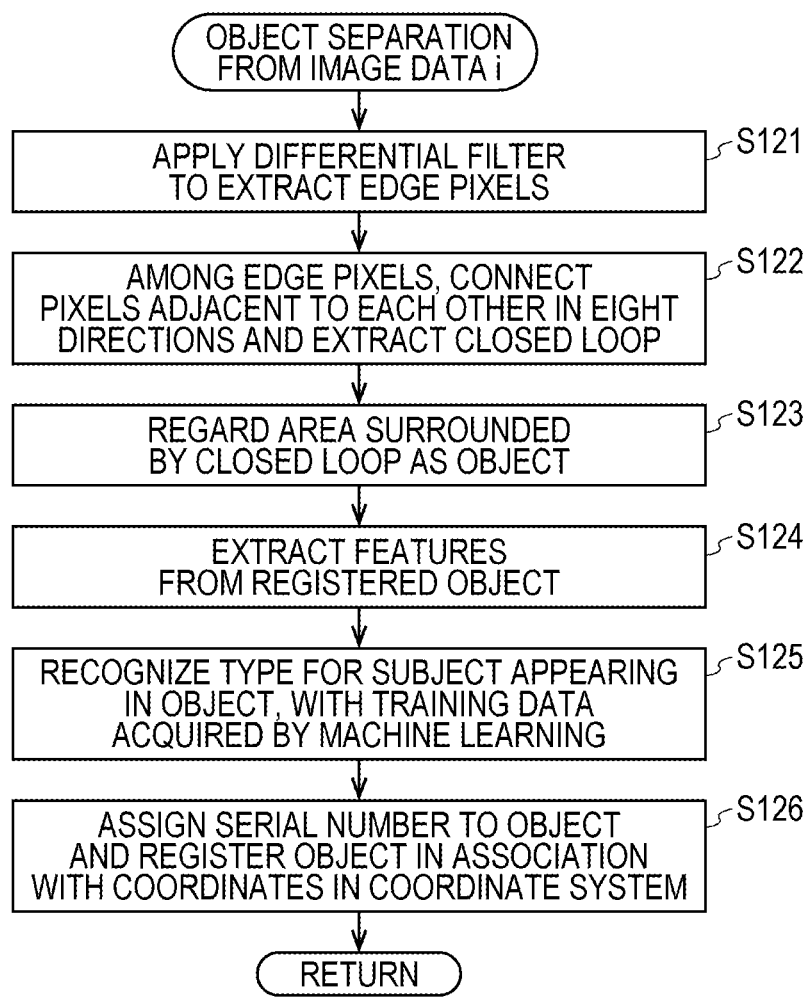
FIG. 12A is a flowchart of a procedure for object separation.

Step S102 is a subroutine. FIG. 12A is a flowchart of a procedure for object separation.

In this flowchart, a differential filter is applied to extract an edge in step S121. The image (differential image) acquired by applying the differential filter has a pattern in which fragmentary bright lines are arranged on a black background. The fragmented bright lines indicate portions where the gradation and hue are discontinuous and the RGB values vary rapidly. A pixel sequence appearing as a bright line in the differential image is referred to as an "edge" and represents the contour of a target object in fragments.

Next, an attempt is made to separate a target object with the edge as a clue. Specifically, in step S122, among the pixels included in the edge, pixels adjacent to each other in eight directions including up, down, left, and right are connected, and a closed loop is extracted. This process will be described in detail.

Any point on the edge is stored as a starting point, and performed is determination regarding whether or not the edge is adjacent to another edge in any of the eight directions. Even if a pixel-free area is present between the edges, when the pixel-free portion is 10% or less of the size of the edges, the pixel-free portion is ignored. The purpose is to give priority to the reproduction of the target object. A plurality of edges is traced while ignoring the gaps between the pixels, and performed is determination regarding whether or not the trajectories of the edges reach the starting point.

What the trajectories of the edges reaches the starting point means that the fragmentary edges forms a closed loop and surrounds one area. In this case, an edge is considered to form the contour of the target object. Thus, in step S123, the area surrounded by the edges is separated as an object.

Furthermore, the features are extracted from the object (step S124). Then, the extracted features are applied to the training data acquired by machine learning to recognize a type for a subject appearing in the object (step S125).

Thereafter, a serial number is assigned to the object, and the object is registered in association with the coordinates in the coordinate system (step S126). Then, at least one registered object is returned.

(3-4) Extended Color Determination

Figure 12B:
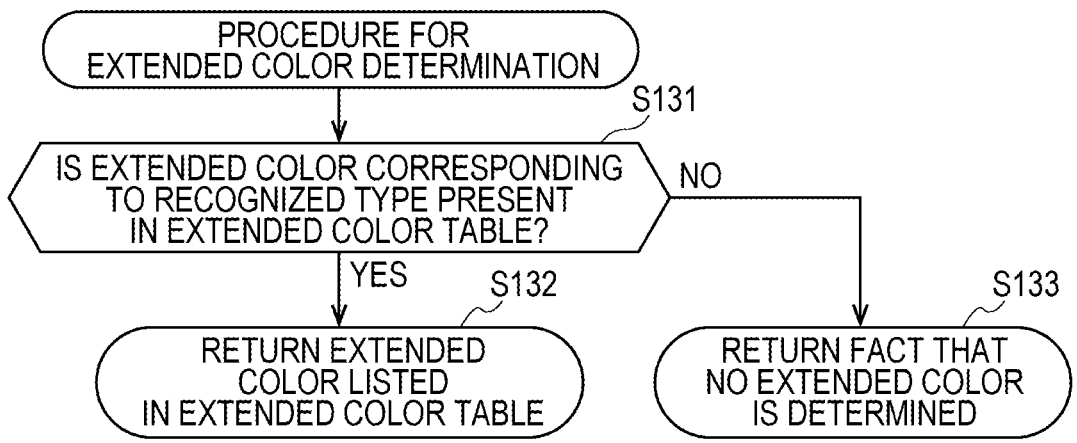
FIG. 12B is a flowchart of a procedure for extended color determination.

The flowchart of FIG. 12B illustrates the details of the procedure for extended color determination in step S108.

In this flowchart, an extended color is determined in consideration of the search tendency of SNS users. Specifically, service users who are SNS users tend to select, as a search condition, a color recognized as the color of a subject. Thus, performed is determination regarding whether an extended color corresponding to the recognized type is present in the extended color table (step S131). If the extended color is present (Yes in step S131), the extended color listed in the extended color table is returned to the main routine (step S132). If no corresponding extended color is present in the extended color table (No in step S131), the fact that no extended color is determined is returned to the main routine (step S133).

Figure 14:
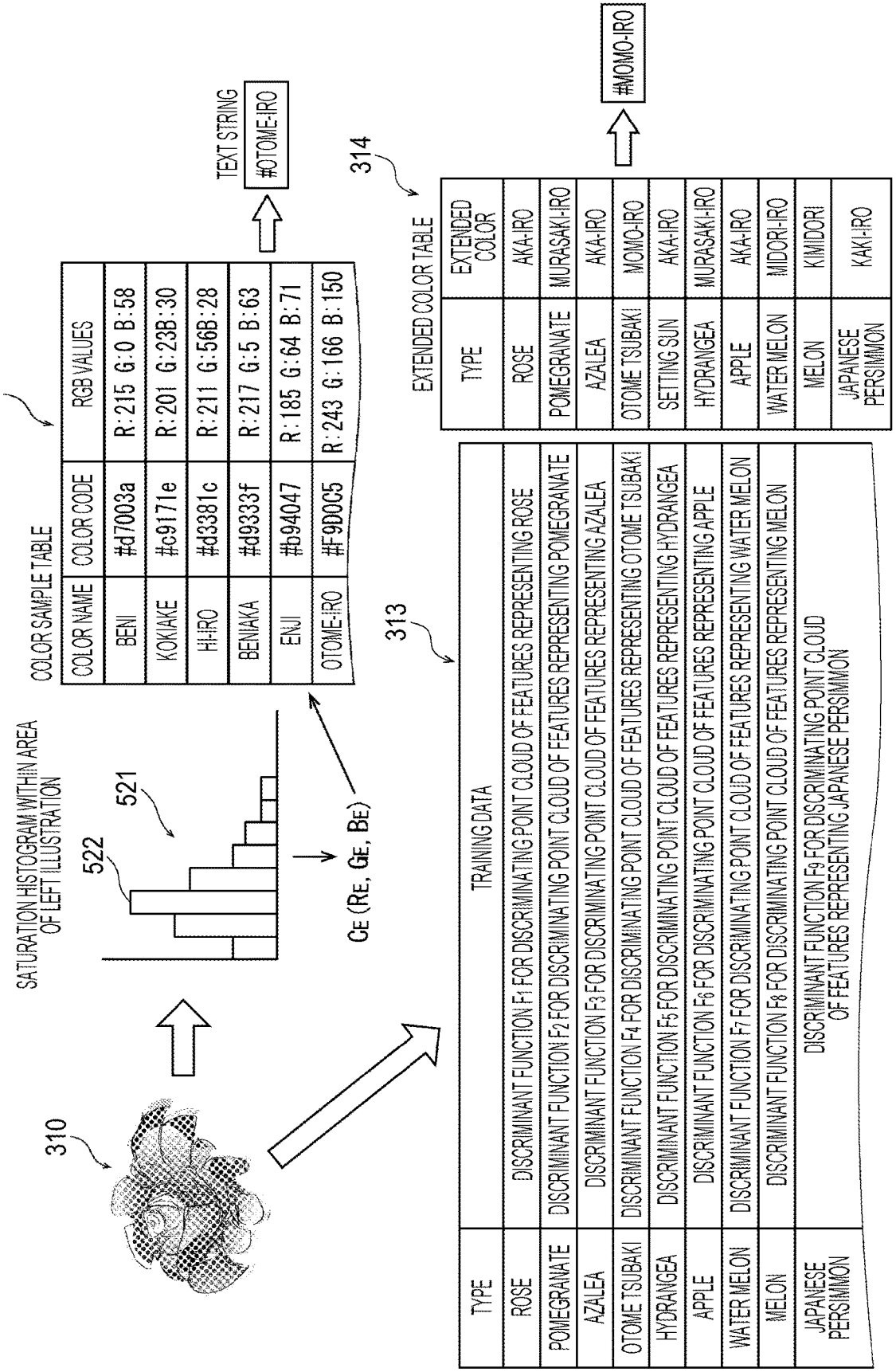
FIG. 14 illustrates the process of determination of an extracted color and an extended color based on an object.

When the image data i is the scanned image 301 in FIG. 13A, edges 511, 512, 513, and 514 are extracted, and the area 1 of the areas 1, 2, 3, 4, and 5 surrounded by these continuous edges is defined as the object j. When a histogram is created for the object j, it is shown as the histogram 521 in FIG. 14. In the histogram 521, the color with the highest frequency 522 (otome-iro in the figure) is the extracted color.

The extended color table 314 that is referenced indicates the colors of real objects such as rose, pomegranate, azalea, otome tsubaki, and sunset in association with one-to-one, as extended colors, the colors of the real objects recognized by the ordinary persons. As a result of recognition of a flower object with a recognition dictionary, if one (otome tsubaki) of the types listed in the extended color table is acquired, mono-iro is acquired as the extended color corresponding to the otome tsubaki. A hash mark "#" is prepended to each of the color names of these extracted color and extended color to create color tags. Together with the color tag, the image data is uploaded to the storage 3001 of the SNS server 3000 and provided for viewing by the SNS users of terminals 1011 to 1014.

[4] Brief of First Embodiment

As described above, according to the present embodiment, an object as a pixel group representing a subject noticed by an SNS user is recognized with training data acquired in the process of machine learning, and a first color tag indicating a color used in the pixels in the recognized object is added to image data to be uploaded. Thus, even if something other than a target object noticed by the SNS user is captured in the image data, the color of the target object can be automatically extracted and the color used in the target object can be indicated with the first color tag. The color of the real object appearing in the image data is faithfully represented with the tag, so that the SNS user who correctly selected the color of the subject and performed the color search can view the image data.

In addition, an extended color is determined on the basis of a type of a separated object, and a second color tag to be added to the image data is created on the basis of the extended color.

When there are tens of thousands of SNS users around the world who use the image viewing system at some point in time, even if some of them do not remember the exact color of a subject appearing in image data and performs color searching with a color recognized as the color of the subject, posted image data will appear on the search-result display screens of the SNS users who performed the color search with the color based on their assumptions. As a result, the impressions and engagement of the posted image data can be increased. The color tag indicating the extracted color and the other color tag indicating the extended color are created and posted to the SNS server together with the image data. As a result, in response to clicking the same color tag, the posted image data will be displayed in the browsers. The image data is presented to both SNS users who correctly remembered the color of the real object and clicked the color tag and SNS users who clicked the color tag relying on the vague memory of the real object, so that the impressions and engagement will increase.

[5] Second Embodiment

In the first embodiment, in the separation of the object and the clarification of the type of the object with the training data, the extended color corresponding to the type is read from the extended color table to determine the extended color of the object. In contrast, in a second embodiment, an extended color is determined on the basis of the search tendency of SNS users that a color close to the color in the gradation of a subject is selected as a search condition.

(5-1) Procedure for Extended Color Determination

Figure 15:
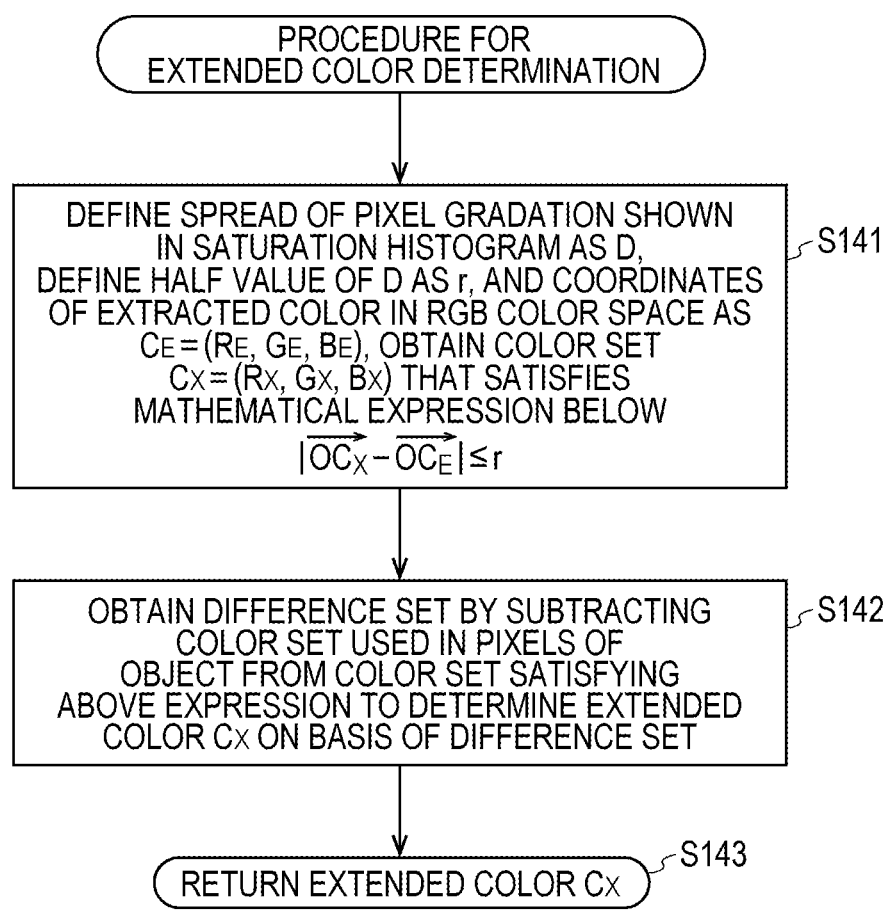
FIG. 15 is a flowchart of a procedure for extended color determination.

In order to determine an extended color on the basis of the spread of the gradation of an object, in the second embodiment, the extended color is determined following the procedure illustrated in FIG. 15. FIG. 15 is a flowchart of the procedure for extended color determination, which is performed instead of the procedure in FIG. 12B.

In step S141, the spread of the pixel gradation shown in the saturation histogram is defined as D, the half value of D is define as r, and the coordinates of the extracted color in the RGB color space are defined as $C_E=(R_E, G_E, B_E)$, and the color set $C_X=(R_X, G_X, B_X)$ that satisfy Mathematical Expression 1 below is obtained (step S141).

$$|\overrightarrow{OC_x}-\overrightarrow{OC_E}| \leq r \quad \text{[Mathematical Expression 1]}$$

Figure 16:
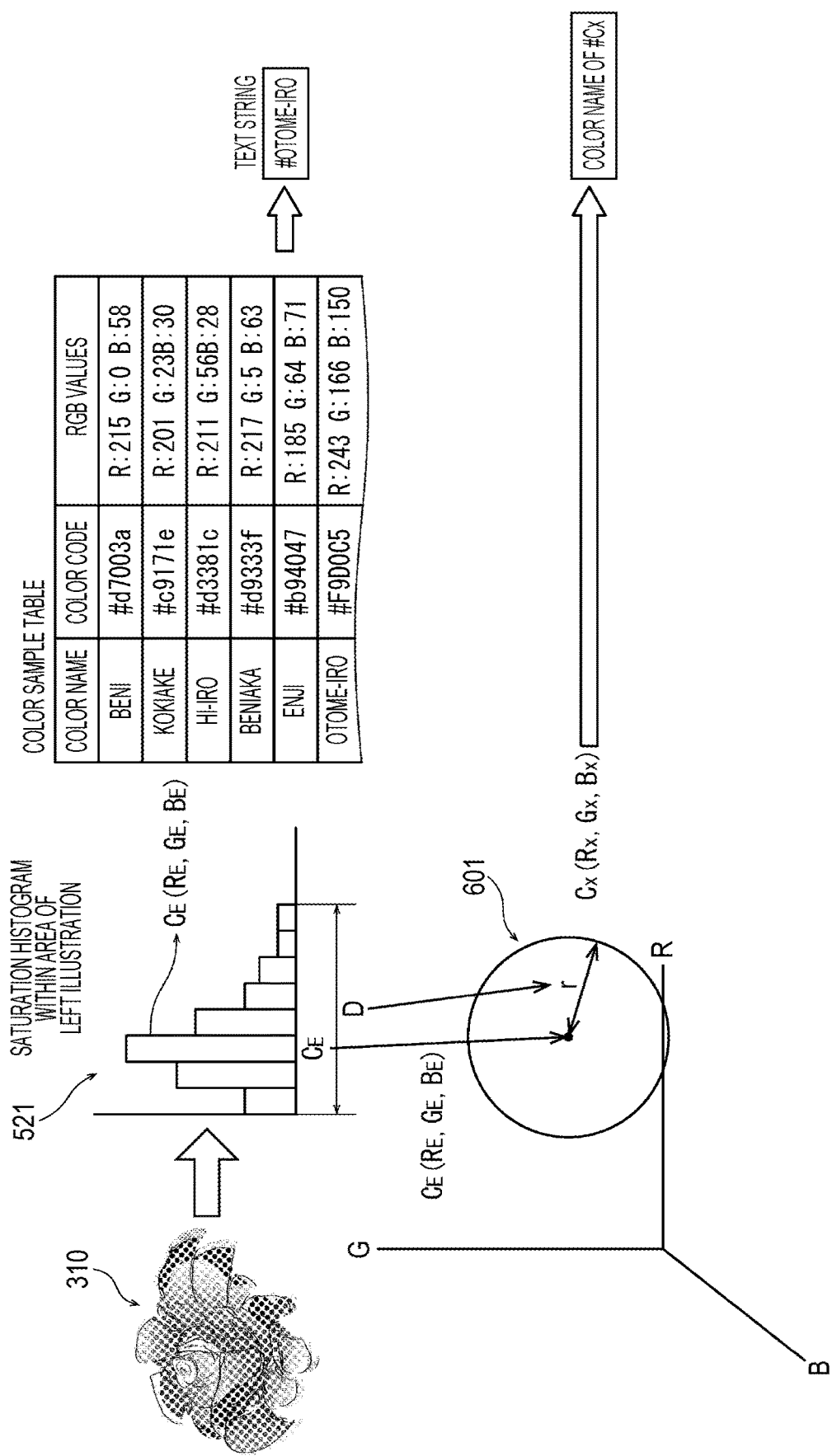
FIG. 16 illustrates the process of determination of an extended color based on a sphere.

The extended color determined in step S141 of FIG. 15 is as shown in FIG. 16. That is, in the RGB color space, the extended color has the coordinates on the surface of the sphere 601 with a radius r around the coordinates ($R_E$, $G_E$, $B_E$) of the extracted color $C_E$, or the coordinates inside the sphere 601.

The color set located on the surface of or inside the sphere is likely to contain the color of the pixels included in the object. In order to eliminate the possibility, the processing of step S142 is performed. Specifically, a difference set is obtained from excluding the set elements of the color set included in the object from the color set that satisfies Mathematical Expression 1 and that is located on the surface of or inside the sphere. Then, the extended color is determined on the basis of the difference set. The difference set can be created with the difference method of a set type and a frozenset type in the programming language Python. The extended color obtained as above is returned to the main routine (step S143).

(5-2) Brief of Second Embodiment

When a pixel object includes a subject as a real object shot, the spread D of the saturation histogram indicates the number of gradation levels of the real object as the subject. The number of gradation levels is regarded as the diameter of a sphere and an extended color is determined on the basis of the color set located on the surface of or inside the sphere.

Thus, even if an SNS user who vaguely remembers the number of gradation levels performs color searching relying on the vague memory, posted image data will be hit.

[6] Third Embodiment

In the second embodiment, an extended color is determined on the basis of the spread of the gradation shown in the saturation histogram and an extracted color. In contrast, in a third embodiment, an extended color is determined on the basis of the search tendency of SNS users that a color close to a plurality of colors with a large frequency in a part representing a subject is selected as a search condition.

(6-1) Procedure for Extended Color Determination

Figure 17:
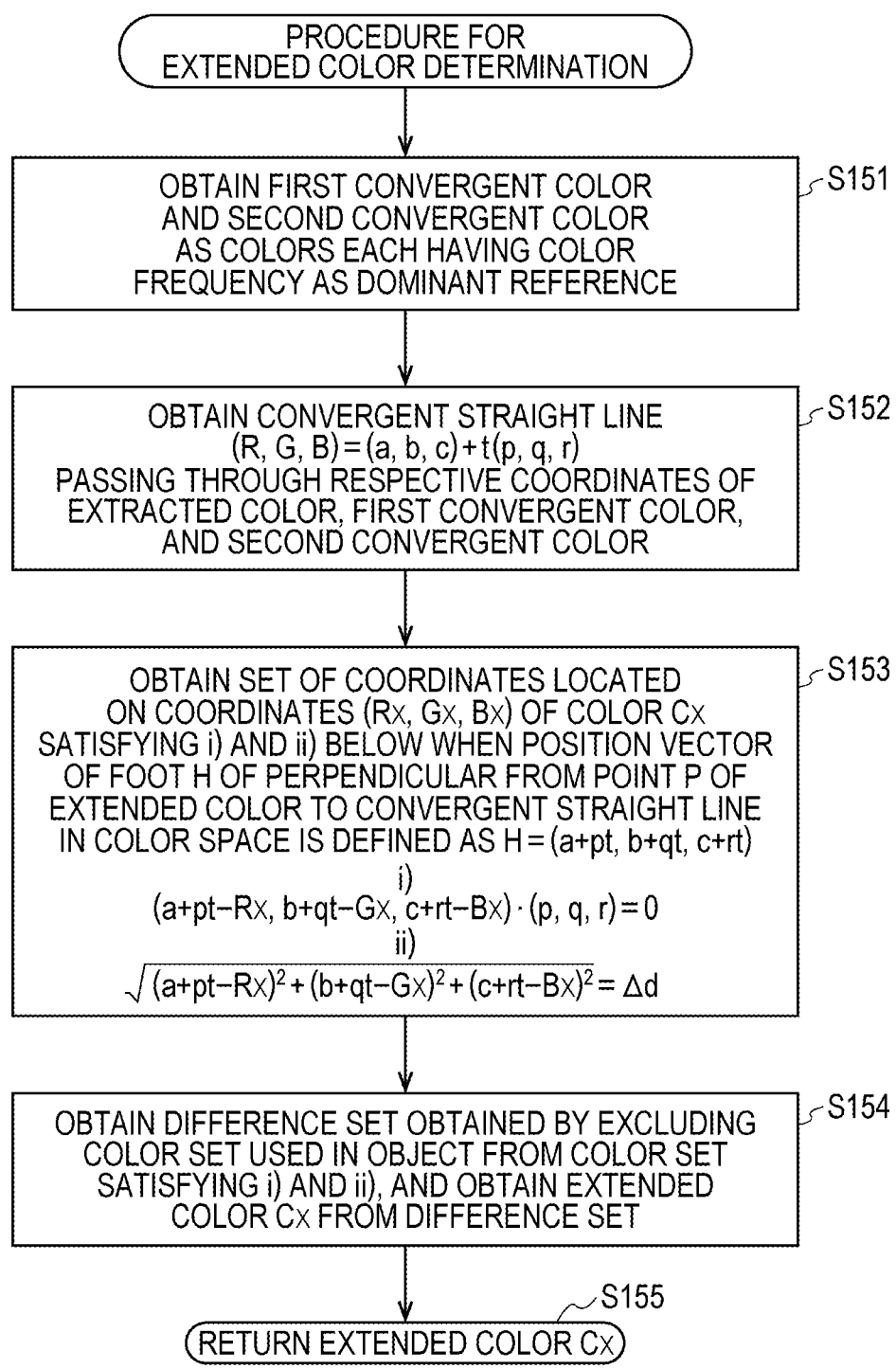
FIG. 17 is a flowchart of a procedure for extended color determination.

In order to determine an extended color on the basis of the number of gradation levels of an object, in the third embodiment, the extended color is determined following the procedure illustrated in FIG. 17. FIG. 17 is a flowchart of the procedure for extended color determination, which is performed instead of the procedure in FIG. 12B.

A first convergent color and a second convergent color are obtained as colors each having the color frequency as a dominant reference (step S151). A dominant reference value is a value of a predetermined ratio (for example, 10%) to the maximum frequency shown in a saturation histogram. A pixel color with the frequency of top 10% as above is a color of a dominant color scheme in an object, and is used to clarify the color scheme of a subject. The frequencies shown in the saturation histogram converge to the dominant reference value, so that colors with a small frequency are ignored in the extended color determination.

Next, the vectors (p, q, r) reaching the color space coordinates of the second convergent color from the color space coordinates of the first convergent color is obtained, and the vector (p, q, r) and the coordinates (a, b, c) of an extracted color are combined to obtain the convergent straight line (R, G, B)=(a, b, c)+t(p, q, r) (step S152) that is a three-dimensional straight line passing through the coordinates of the extracted color, the first convergent color, and the second convergent color.

Assuming that the position vector of the foot H of a perpendicular from the point $C_X$ of the extended color to the convergent straight line in the RGB color space is H=(a+pt, b+qt, c+rt), the set of the coordinates ($R_X$, $G_X$, $B_X$) of the color $C_X$ satisfying i) and ii) of Mathematical Expression 2 below is obtained (step S153).

i)

$$(a+pt-R_X, b+qt-G_X, c+rt-B_X) \cdot (p, q, r) = 0$$

ii)

$$\sqrt{(a+pt-R_X)^2+(b+qt-G_X)^2+(c+rt-B_X)^2}=\Delta d \quad \text{[Mathematical Expression 2]}$$

Figure 18:
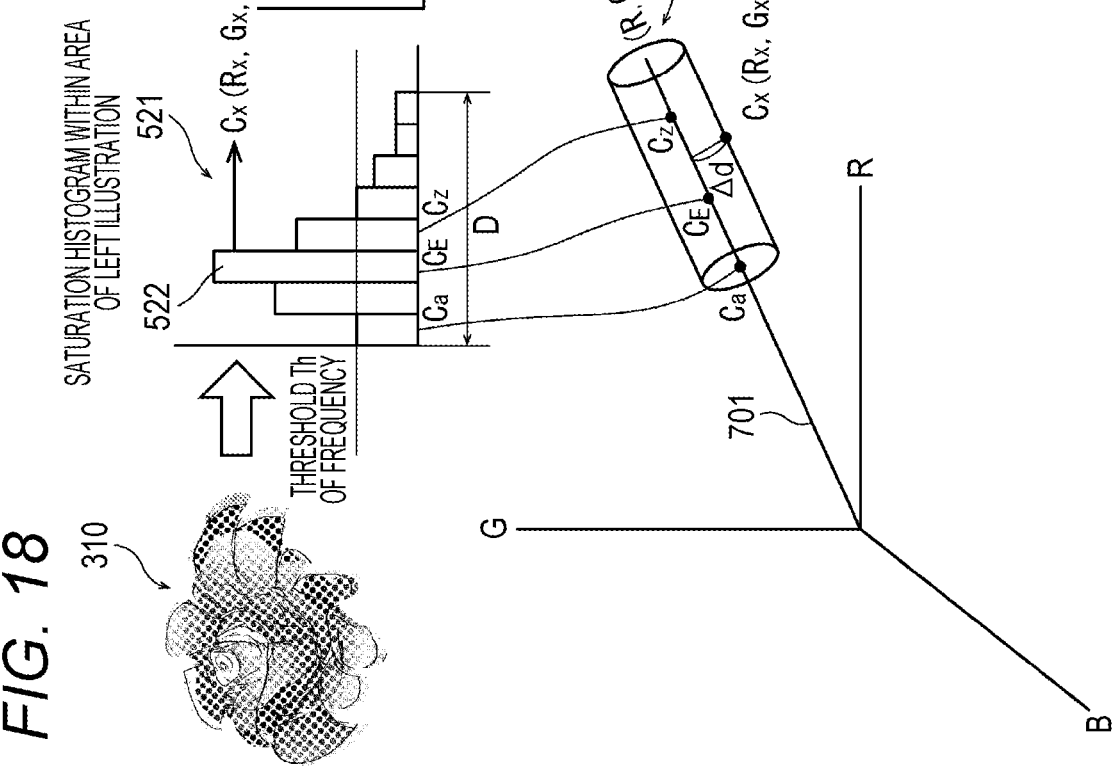
FIG. 18 illustrates the process of determination of an extended color based on a cylinder.

The extended color determined in step S153 above is as shown in FIG. 18. The color set located on the surface of the cylinder 702 with the convergent straight line 701 as the central axis and a radius Δd is likely to include a color of pixels of the object.

In order to eliminate the possibility, the processing of step S154 is performed. Specifically, a difference set is obtained by excluding the set elements of the color set included in the object from the color set that satisfies i) and ii) and that is located on the surface of the cylinder, the extended color is determined on the basis of the difference set, and then the determined extended color is returned to the main routine (step S155).

The radius Δd has a value to some extent that separates two to five colors in the RGB color space, and the color set occupying the surface of the cylinder that occupies the diameter is determined as the extended color. Thus, a tag indicating the color almost close to the color with a high frequency in the saturation histogram can be added to image data. The surface of the cylinder with the convergent straight line as the central axis is defined as the coordinate of the extended color. As a result, even if an SNS user does not correctly remember the gradation of an object and selects a wrong color under the search condition, posted image data will be hit.

(6-2) Brief of Third Embodiment

As described above, according to the present embodiment, a three-dimensional straight line is defined on the basis of the color space coordinates of a color that converges to a certain frequency, and an extended color is determined on the basis of the range occupied by the surface of a cylinder with the three-dimensional straight line as an axis. Thus, in the color scheme of an object, a color close to a dominant color can be selected as the extended color.

When there are tens of thousands of SNS users around the world who use the image viewing system, even if some of them vaguely remember the variation in gradation of a subject and select, from the palette, a color close to an extracted color in accordance with the memory to perform searing, posted image data will be hit. As a result, the impressions and engagement of the posted image data can be increased.

[7] Fourth Embodiment

In the third embodiment, an extended color is determined on the basis of the distance from a straight line passing through the coordinates of a color shown in a histogram in the color space. In contrast, in a fourth embodiment, an extended color is determined on the basis of the search tendency of SNS users that a color higher in saturation and/or value than a color used in a part representing a subject is selected as a search condition.

(7-1) Extended Color Determination

Figure 19:
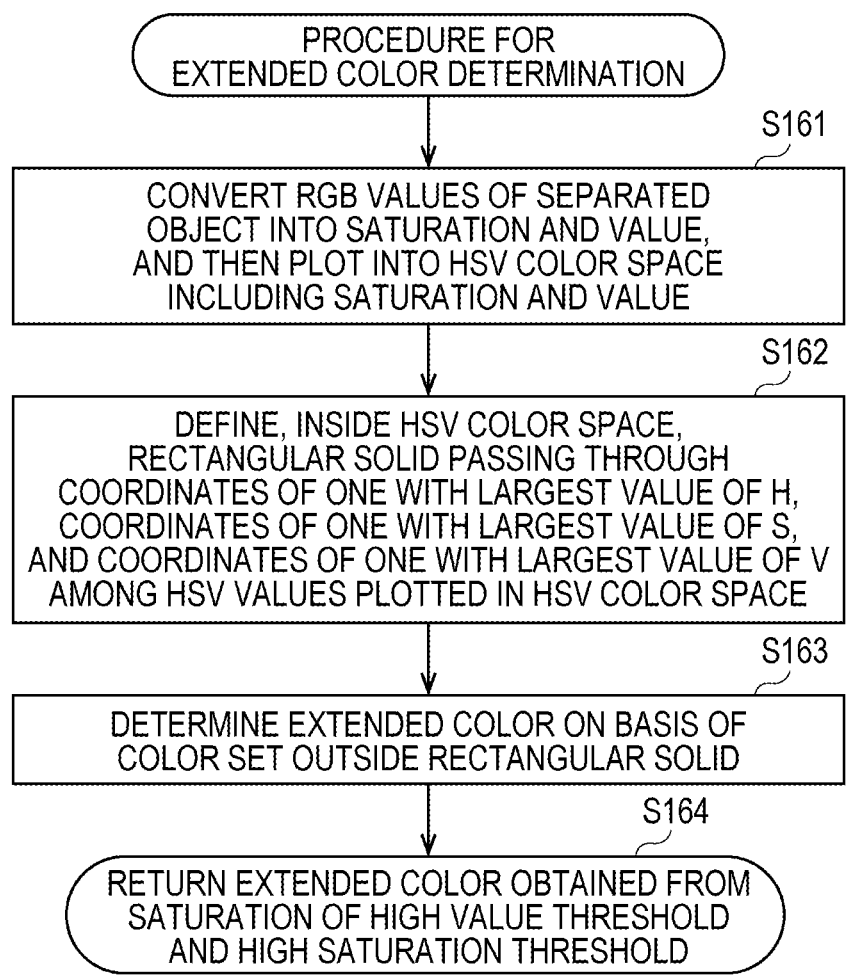
FIG. 19 is a flowchart of a procedure for extended color determination.

In the fourth embodiment, the extended color is determined following the procedure illustrated in FIG. 19. FIG. 19 is a flowchart of the procedure for extended color determination, which is performed instead of the procedure in FIG. 12B.

The colors (RGB values) of a separated object are converted into HSV values and the HSV values are plotted into the HSV color space (step S161). A rectangular solid passing though the coordinates of one with the largest value of H, the coordinates of one with the largest value of S, and the coordinates of one with the largest value of V among the HSV values plotted in the HSV color space is defined inside the HSV color space (step S162). The defined rectangular solid is as illustrated in FIG. 20. It is assumed that the RGB values of the pixels of the object are plotted at the coordinates 801, 802, 803, and 804 to 807 illustrated in FIG. 20 in the HSV color space. Of these coordinates, the value of H at the coordinates 807, the value of S at the coordinates 806, and the value of V at the coordinates 805 are the largest, and thus the rectangular solid 810 passing through these coordinates is defined. The rectangular solid defined as above indicates where in the HSV color space the colors of the separated object are distributed, that is, the color distribution range of the pixels of the object in the HSV color space. In addition, faces of the rectangular solid indicate a boundary face of value and a boundary face of saturation. Next, an extended color is determined on the basis of the color set located outside the rectangular solid (step S163). In the HSV color space, the extended color is determined on the basis of the color set spaced apart from the faces of the rectangular solid (value boundary face, saturation boundary surface) by two to five colors. Thus, a second color tag representing a color that emphasizes the color saturation and value of a real object as the subject is added to image data. As a result, determined are the extended color 811 located outside the boundary line of the value and the extended colors 812 and 813 located outside the boundary lines of the value and the saturation. After the color determination through the above process, the extended colors are returned to the main routine (step S164).

(7-2) Brief of Fourth Embodiment

When there are tens of thousands of SNS users around the world who use the image viewing system, even if some of them impressively remember part of the subject with high value and saturation and select, from the palette, a color close to an extracted color in accordance with the memory to perform searching, posted image data will be hit. As a result, the impressions and engagement of the posted image data can be increased.

[8] Fifth Embodiment

In the first to fourth embodiments, an extended color and an extracted color are represented with different color tags. In contrast, in the present embodiment, performed is determination regarding whether an extracted color and an extended color are represented with different color tags or the extracted color and the extended color represented with a single color tag, in accordance with the distance between the coordinates of the extended color and the coordinates of the extracted color in the RGB color space.

(8-1) Processing Procedure

Figure 21:
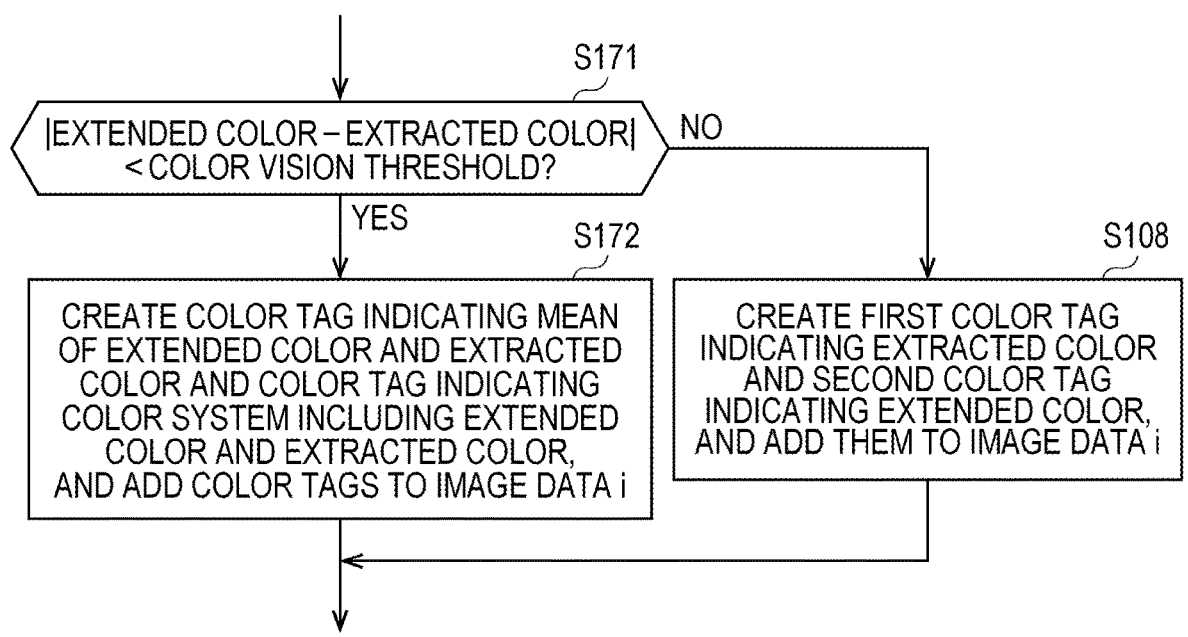
FIG. 21 is a flowchart of a procedure for tag generation according to the distance between color coordinates.

FIG. 21 illustrates the changed part of the main routine. In the present embodiment, steps S171 and S172 illustrated in this figure are added. Step S171 is determination regarding whether the distance between the coordinates of an extracted color and the coordinates of an extended color in the RGB color space falls below a predetermined color vision threshold $D_t$. The color vision threshold $D_t$ is the interval between at least two color space coordinates recognized as colors that are similar colors. Even if the color space coordinates are different, the human eyes may recognize a plurality of colors as the same colors or similar colors. In the color vision characteristics of the human eyes, a boundary value recognized as the same color or a similar color is set in advance as a color vision threshold, and the distance between the coordinates of the extracted color and the coordinates of the extended color is compared with the color vision threshold.

When the intercolor distance is not less than the color vision threshold $D_T$, the result of the determination in step S171 becomes No, and step S108 in FIG. 11 is performed.

If the distance between the coordinates of the extracted color and the coordinates of the extended color in the RGB color space falls below the color vision threshold $D_t$, the result of the determination in step S171 becomes Yes, and step S172 is performed. In step S172, both the extracted color and the extended color are represented with a single color tag. Such a single color tag includes one indicating an intermediate color between the extracted color and the extended color, and one indicating a color system including the extracted color and the extended color. In addition, one indicating the extracted color or one indicating the extended color may be used.

Figure 22A:
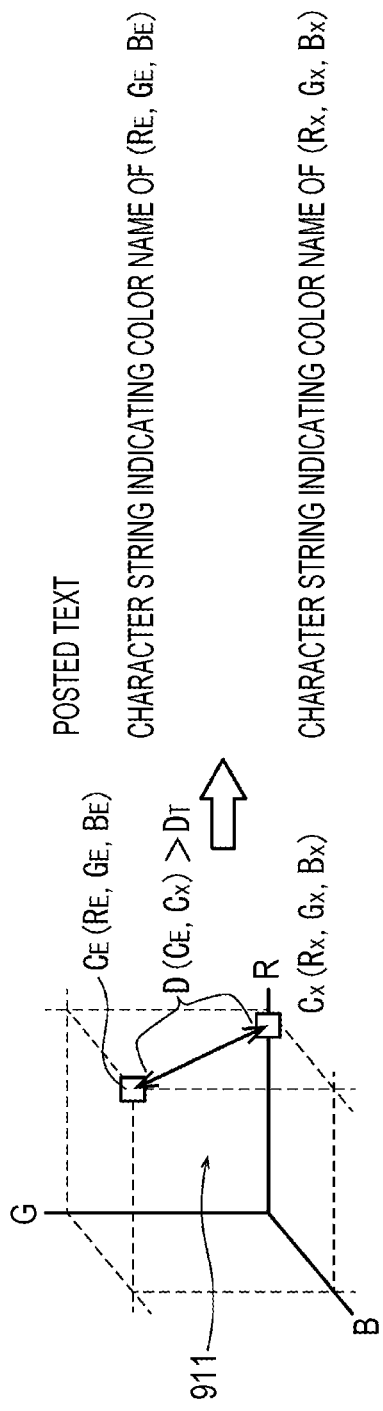
FIGS. 22A and 22B illustrate the process of switching between creation of a single tag and creation of a plurality of tags according to the distance between color coordinates.

It is assumed that the pair 911 of an extracted color and an extended color in FIG. 22A is a target. In this pair 911, the distance D ($C_E$, $C_X$) between the coordinates $C_E$ of the extracted color and the coordinates $C_X$ of the extended color exceeds the color vision threshold and $D_T$, thus the result of the determination is step S171 becomes No. In this case, as described in the first embodiment, a first color tag indicating the extracted color and a second color tag indicating the extended color of the above pair 911 are created (step S108).

Figure 22B:
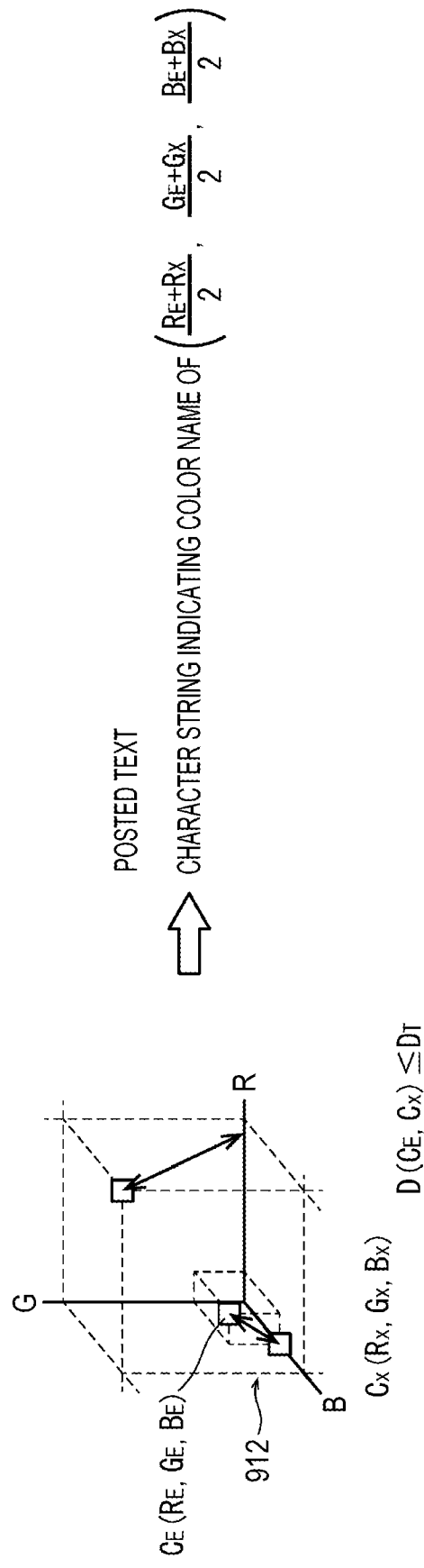

It is assumed that the pair 912 of an extracted color and an extended color in FIG. 22B is a target. In the pair 912 of the extracted color and the extended color, the distance D ($C_E$, $C_X$) between the coordinates $C_E$ of the extracted color and the coordinates $C_X$ of the extended color is the color vision threshold $D_T$ or less, and thus the result of the determination in step S171 becomes Yes. In this case, for example, the coordinates ($R_E$, $G_E$, $B_E$) of the extracted color $C_E$ and the coordinates ($R_X$, $G_X$, $B_X$) of the extended color $C_X$ in the above pair 912 are added together and divided by 2 to calculate the RGB values of the intermediate color of the extracted color and the extended color (step S172). The color name of the color corresponding to the RGB values calculated in such a manner is used as a color tag to be added to image data.

(8-2) Brief of Fifth Embodiment

In the RGB color space, when an extracted color and an extended color are located at adjacent coordinates, the colors are expressed with a single tag, resulting in a margin in the number of characters in a text string that can be posted. As a result, additional features such as the name or shape of an article can be expressed with a tag. Note that if it is attempted that a continuous range including an extracted color and an extended color is expressed with a plurality of tags, an unintended color will be expressed with the tags. Such an expressed unintended color is likely to become noise that prevents SNS users from searching. However, in the present embodiment, tagging is switched between a single tag and two tags in accordance with the level of the distance and thus such noise is not expressed with a tag.

[9] Modifications

The present invention has been described above on the basis of the embodiments. The present invention, however, is not limited to the above embodiments, and thus the following modifications are conceivable.

Figure 23A:
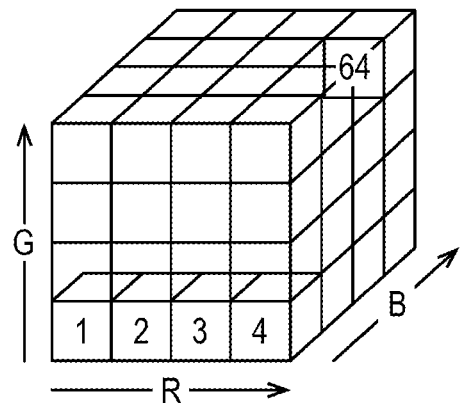
FIGS. 23A to 23C illustrate an expression of color space coordinates with serial numbers.

(1) The color of each pixel of an object is expressed with a value of R in 256 gradation levels, a value of G in 256 gradation levels, and a value of B in 256 gradation levels however, the expression is not limited to this example. The color of each pixel of an object may be expressed with a serial number of the subspace inside the RUB color space. FIG. 23A illustrates 64 (=4×4×4) subspaces acquired by evenly dividing the RGB color space. Each of the subspaces is a cube, and the serial numbers "1", "2", "3", and "4" are added in order from the one closest to the origin.

Figure 23B:
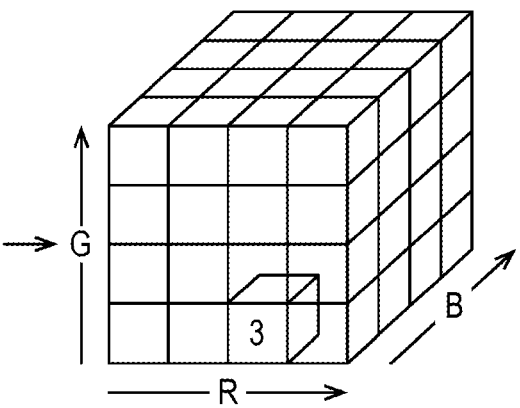
Figure 23C:
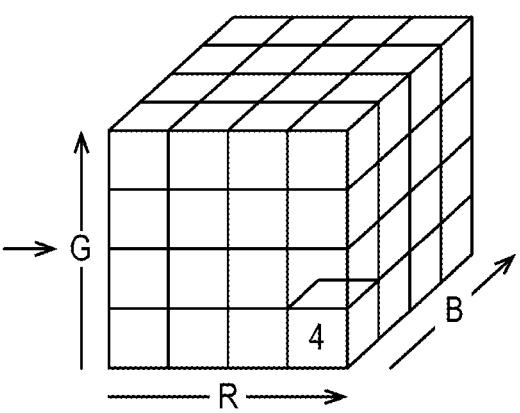

With these serial numbers, sekkoku with the RUB values (135, 13, 3) is indicated with the number "3" as illustrated in FIG. 23B. In addition, aka with the RGB values (255, 0, 0) is indicated with the number "4" as illustrated in FIG. 23C. Determining which subspace an extracted color and an extended color belong to and storing the serial number of the subspace can reduce the data size when holding the extended color and the extended color.

(2) In the above embodiments, an edge is extracted from image data and an object including a subject is separated, but the present invention is not limited to this example. An object may be acquired by separating an area occupied by continuous pixels having similar colors. Specifically, as illustrated in FIG. 13B, the RGB values of the pixels of the object are converted into HSV values to specify a pixel group in which pixels having the same hue are continuous. Such hue separation results in image separation according to a rough classification such as reddish color and greenish color. The separated pixel group is a series of pixels having substantially the same hue and has similar colors. Separation of a pixel group having such a similar color can provide an object similar to that acquired by the above edge extraction.

A color having the maximum frequency in a saturation histogram is determined as an extracted color, but this is merely an example. In the order of indication in appearance frequency, a color at not less than a predetermined rank in the ranking of the colors used in the pixels in an object, such as an occupancy of 10% or more in the entirety, may be determined as an extracted color. This is because that although it is recognized that "apples are aka", the pixels occupying a large area in an actual apple are sekkoku and not necessarily aka and it is likely that a characteristic color representing a target object is extracted if some colors at higher ranks are extracted.

(3) The image viewing system may also implement an image posting service, a moving-image posting service, a personal introduction service, an online shopping service, a short-sentence posting service, a bulletin board service, a store-information providing service, and a purchase-and-sale and exchange service for used goods. The number of characters is limited for a text string that can be posted with image data, but the limitation is not limited to this example. Instead of the limitation for the number of characters, the number of color tags may be limited in addition to the limitation of for the number of characters.

(4) In the above embodiments, image data acquired by scanning with the MFP 1000 is uploaded to the SNS server, but uploading is not limited to this example. Image data shot by a smartphone, tablet, or camera may be uploaded to the SNS server.

(5) The tagging application 201A is a pre-installed type application pre-installed in the image processing device 2000, but the tagging application 201A is not limited to this example. The tagging application 201A may be recorded on a portable recording medium and may be sold as a software package, or may be uploaded to an application distribution server and may be distributed by the application distribution server.

(6) The image processing device 2000 is achieved with a computer device installed in the premises of the business establishment. The image processing device 2000, however, may be achieved with a cloud server. The cloud server has an operating system (OS) and a tagging application 201A installed thereon. In response to a request from a terminal 1011, a guest OS starts up and the tagging application 201A is launched on the guest OS. As a result, the processing described in the above embodiments is performed. The image processing device 2000 is a device independent of the MFP 1000, but the image processing device 2000 is not limited to this example. The MFP1000 and the image processing device 2000 may be integrally formed with one apparatus. Furthermore, the image processing device 2000 performs tagging and uploads image data, but the image processing device 2000 is not limited to this example. The image processing device 2000 may perform tagging and another device may upload image data.

A tagging application 201A may be installed and used on the terminals 1011 to 1014 operated by SNS users. This is because SNS users typically post images. Furthermore, a tagging application 201A may be provided on an SNS server.

(7) In the second and third embodiments, a difference set is obtained to determine an extended color on the basis of the difference set, but the determination is not limited this example. If a color used as the color of the pixels of an object and not extracted as an extracted color is present on the surface of or inside the sphere of the second embodiment, the color may be determined as the extended color. Similarly, if a color used as the color of the pixels of the object and not extracted as an extracted color is present on the surface of the cylinder of the third embodiment, the color may be determined as the extended color.

In addition, a tag indicating an extended color determined on the basis of the type of a pixel object, a tag indicating an extended color determined on the basis of the number of gradation levels of the pixel object, a tag indicating an extended color determined on the basis of a first convergent color and a second convergent color, or a tag indicating an extended color determined on the basis of a saturated value of saturation or value may be added to image data. Such tagging enables broad-ranging color expression for the pixel object appearing in image data, resulting in an increase in impressions for uploading image data read by the seamier 1004 to the SNS server 3000.

(8) HSV values may be described in the field of each color in the color sample data. Such description advantageously facilitates conversion of the RGB values to the HSV values. A conversion formula may be stored in advance in the non-volatile memory 204 and the RGB values may be converted into the HSV values on the basis of the conversion formula.

(9) In each embodiment, a color name and a color code are used as color tags, but a tag is not limited to this example. A tag with a hash mark "#" added to a text string indicating a noun phrase, an adjective phrase, or an adverbial phrase including a color name may be created. For example, text strings such as "#akamiwoobita", "#akai", "#akaku", and "#akappoi" may be listed in advance in the color sample data and the extended color table, and may be added the hash tag including these text strings and the hash marks to image data. In addition, the color names for the color tags are Japanese, but the language is not limited to this example. The color names of a plurality of languages such as English, Chinese, Russian, French, Spanish, and Arabic may be listed in the color sample data and the extended color table, and an extracted color and an extended color may be expressed with the color tags of the plurality of languages. In addition, a language selection may be received from a distributor and the color tag of the selected language may be added to image data.

The present disclosure can be used in the industrial fields of various industries that transmit information with SNS servers, and is likely to be used the industrial fields of various industries such as office automation (OA) equipment and information equipment, and the industrial fields of various industries such as retailing, antique dealers, leasing, real estate, advertising, transportation, and publishing.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing device comprising:
one or more processors; and
memory storing instructions that, when executed by the one or more processors, cause the image processing device to:
recognize a part representing a target object from the image data;
extract a first color associated with pixels comprised by the part representing the target object, wherein the first color is represented by a value of R, a value of G, and a value of B, and wherein the value of R, the value of G, and the value of B indicate subspaces of an RGB color space associated with the first color;
determine a second color that is not extracted from the part but is likely to be used in searching by a service user, based on a search tendency in searching by the service user; and
create a first tag indicating the first color and a second tag indicating the second color; and
add the first tag and the second tag as search tags to the image data.

2. The image processing device according to claim 1, wherein the color extracted by the extractor is a color highest in appearance frequency in the pixels of the part in the target object, or a color at not less than a predetermined rank in ranking of a plurality of colors arranged in order of indication in the appearance frequency.

3. The image processing device according to claim 1, wherein the search tendency of the service user is a tendency of selecting, as a search condition, a color recognized as a color of the target object, and
the determiner has a reference table indicating colors typically recognized as colors representing one-to-one a plurality of types of a real object and
determines, as the color that is likely to be used in searching by the service user, a color listed in the reference table as a color corresponding to a type of the target object determined.

4. The image processing device according to claim 1, wherein the search tendency of the service user is a tendency of selecting, as a search condition, a color close to a color in gradation of the target object, and
the determiner creates a color set including colors located on a surface of and inside a sphere that occupies a range of gradation of the part as a diameter and has color space coordinates of the color extracted by the extractor as center coordinates, and
the color that is likely to be used in searching is a color included in the color set created.

5. The image processing device according to claim 1, wherein the search tendency of the service user is a tendency of selecting, as a search condition, a color close to a color in a frequency distribution in the part representing the target object,
the determiner performs:
processing (1) of obtaining a first convergent color and a second convergent color as convergent points in convergence of a frequency in the frequency distribution to a predetermined value; and
processing (2) of creating a color set located on a surface of a cylinder that has, as a center axis, a three-dimensional straight line passing through color space coordinates of the color extracted by the extractor, color space coordinates of the first convergence point, and color space coordinates of the second convergence point and has a predetermined offset as a diameter, and
the color that is likely to be used in searching is a color included in the color set created.

6. The image processing device according to claim 1, wherein the search tendency of the service user is a tendency of selecting, as a search condition, a color higher in saturation and/or value than the color used in the part representing the target object, and
the determiner includes:
processing (1) of defining a subspace in which the color used in the pixels of the part recognized is distributed in an HSV color space; and
processing (2) of creating a color set located, outside the subspace, at a place at which the saturation or the value is higher, in the HSV color space, and
the color that is likely to be used in searching is a color included in the color set.

7. The image processing device according to claim 1, wherein the adder creates the first tag and the second tag when a distance between color space coordinates of the color extracted by the extractor and color space coordinates of the color determined by the determiner exceeds a predetermined threshold.

8. The image processing device according to claim 7, wherein when the distance between the color space coordinates of the color extracted by the extractor and the color space coordinates of the color determined by the determiner falls below the predetermined threshold, the adder creates a single tag to be added to the image data, and
the single tag indicates any of an intermediate color between the color extracted by the extractor and the color determined by the determiner, a color group including the color extracted by the extractor and the color determined by the determiner, the color extracted by the extractor without any change, and the color determined by the determiner without any change.

9. The image processing device according to claim 1, wherein the recognizer determines whether the image data includes a real object shot or depicted, and the determiner determines the color that is likely to be used in searching, when the image data is determined as the real object shot or depicted.

10. The image processing device according to claim 9, wherein when determination regarding whether a histogram indicating a frequency of the color has a spread at not less than a predetermined width is performed, the recognizer makes, in a case where the histogram has the spread at not less than the predetermined width, a determination result that a part in the image data includes the real object shot or depicted.

11. The image processing device according to claim 9, wherein the recognizer includes training data that corresponds to each of a plurality of types of a real object and defines a separation plane that separates a point cloud of features representing the corresponding type of the real object from a point cloud of features not representing the corresponding type of the real object, and
the recognizer calculates features from the part representing the target object in the image data, applies the features to the training data corresponding to each type, and makes a determination result of whether a part in the image data includes the real object shot or depicted.

12. The image processing device according to claim 1,
wherein the recognizer performs processing of extracting pixels as an edge from pixels in the image data, and the part representing the target object includes a group of pixels surrounded by the pixels as the edge.

13. The image processing device according to claim 1,
wherein the recognizer performs processing of separating an area occupied by pixels having similar colors from the image data, and the part representing the target object includes the pixels in the area separated as having the similar colors.

14. An image viewing system including a server that performs searching based on a search condition set by a terminal, the system comprising:

one or more processors; and memory storing instructions that, when executed by the one or more processors, cause the image viewing system to perform process steps including:

recognizing a part representing a target object from image data;

extracting a first color associated with pixels comprised by the part representing the target object, wherein the first color is represented by a value of R, a value of G, and a value of B, and wherein the value of R, the value of G, and the value of B indicate subspaces of an RGB color space associated with the first color;

determining a second color that is not extracted from the part but is likely to be used in searching by a service user, based on a search tendency in searching by the service user; and creating a first tag indicating the color extracted and a second tag indicating the color determined and adding the first tag and the second tag as search tags to the image data.

15. The image viewing system according to claim 14, further comprising:

causing the terminal to display a palette and receive, from the service user, a color selected as a search condition from the palette; and causing the terminal to display a search result screen including the image data to which the first tag matching the search condition is added and/or the image data to which the second tag matching the search condition is added.

16. The image viewing system according to claim 15, further comprising:

causing, when the service user selects, with the terminal displaying a list screen including a first hash tag as the first tag and/or a second hash tag as the second tag, any of the hash tags, the terminal to display different image data to which the first hash tag and/or the second hash tag is added.

17. A non-transitory recording medium storing a computer readable image processing program causing a computer to perform processing of assisting searching for image data in an image viewing service, the processing comprising:

recognizing a part representing a target object from the image data;

extracting a first color associated with pixels comprised by the part representing the target object, wherein the first color is represented by a value of R, a value of G, and a value of B, and wherein the value of R, the value of G, and the value of B indicate subspaces of an RGB color space associated with the first color;

determining a second color that is not extracted from the part but is likely to be used in searching by a service user, based on a search tendency in searching by the service user; and creating a first tag indicating the color extracted in the extracting and a second tag indicating the color determined in the determining and adding the first tag and the second tag as search tags to the image data.

18. An image processing method of assisting searching for image data in an image viewing service, the image processing method comprising:

recognizing a part representing a target object from the image data;

extracting a first color associated with pixels comprised by the part representing the target object, wherein the first color is represented by a value of R, a value of G, and a value of B, and wherein the value of R, the value of G, and the value of B indicate subspaces of an RGB color space associated with the first color;

determining a second color that is not extracted from the part but is likely to be used in searching by a service user, based on a search tendency in searching by the service user; and creating a first tag indicating the color extracted in the extracting and a second tag indicating the color determined in the determining and adding the first tag and the second tag as search tags to the image data.

* * * * *